United States Patent
Tsai et al.

(10) Patent No.: US 8,351,136 B2
(45) Date of Patent: Jan. 8, 2013

(54) OPTICAL IMAGING LENS SYSTEM

(75) Inventors: Tsung Han Tsai, Taichung (TW); Hsin Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 202 days.

(21) Appl. No.: 12/963,768

(22) Filed: Dec. 9, 2010

(65) Prior Publication Data

US 2012/0086848 A1    Apr. 12, 2012

(30) Foreign Application Priority Data

Oct. 6, 2010 (TW) .............................. 99133980 A

(51) Int. Cl.
  *G02B 13/18* (2006.01)
  *G02B 9/34* (2006.01)
(52) U.S. Cl. ........ 359/772; 359/715; 359/773; 359/774; 359/775
(58) Field of Classification Search .......... 359/713–716, 359/772–774
See application file for complete search history.

(56) References Cited

U.S. PATENT DOCUMENTS

| | | | |
|---|---|---|---|
| 5,862,000 A * | 1/1999 | Takahashi et al. ............ | 359/773 |
| 7,145,736 B2 | 12/2006 | Noda | |
| 7,277,238 B2 | 10/2007 | Noda | |
| 7,365,920 B2 | 4/2008 | Noda | |
| 2009/0059392 A1 * | 3/2009 | Sano .............................. | 359/715 |
| 2010/0103533 A1 | 4/2010 | Taniyama | |

* cited by examiner

*Primary Examiner* — Scott J Sugarman
*Assistant Examiner* — Robert E Tallman
(74) *Attorney, Agent, or Firm* — Morris, Manning & Martin, LLP; Tim Tingkang Xia, Esq.

(57) ABSTRACT

This invention provides an optical imaging lens system in order from an object side to an image side including: a first lens element with positive refractive power having a convex object-side surface and a concave image-side surface, a second lens element with negative refractive power having a convex object-side surface and a concave image-side surface, a third lens element with positive refractive power, and a fourth lens element having a concave image-side surface, and at least one of the object-side and image-side surfaces thereof being aspheric; wherein the optical imaging lens system further comprises an aperture stop and an electronic sensor on which an object is imaged, and the aperture stop is positioned between an object and the first lens element; wherein there are four lens elements with refractive power. By such arrangement, total track length and photosensitivity of the optical imaging lens system can be effectively reduced while retaining high image quality.

20 Claims, 22 Drawing Sheets

| TABLE 1 | | | | | | | |
|---|---|---|---|---|---|---|---|
| (Embodiment 1) | | | | | | | |
| f = 3.54 mm, Fno = 2.85, HFOV= 32.4 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.150 | | | | |
| 2 | Lens 1 | 1.14006 (ASP) | 0.450 | Plastic | 1.544 | 55.9 | 2.18 |
| 3 | | 25.00000 (ASP) | 0.083 | | | | |
| 4 | Lens 2 | 33.33330 (ASP) | 0.300 | Plastic | 1.632 | 23.4 | -3.59 |
| 5 | | 2.11858 (ASP) | 0.644 | | | | |
| 6 | Lens 3 | -1.14350 (ASP) | 0.572 | Plastic | 1.544 | 55.9 | 10.67 |
| 7 | | -1.12371 (ASP) | 0.040 | | | | |
| 8 | Lens 4 | 1.27740 (ASP) | 0.437 | Plastic | 1.544 | 55.9 | -29.54 |
| 9 | | 1.04069 (ASP) | 0.300 | | | | |
| 10 | IR-filter | Plano | 0.300 | Glass | 1.517 | 64.2 | - |
| 11 | | Plano | 0.999 | | | | |
| 12 | Image | Plano | - | | | | |
| Note: Reference wavelength is d-line(587.6 nm) | | | | | | | |

Fig.6

| TABLE 2 | | | | |
|---|---|---|---|---|
| Aspheric Coefficients | | | | |
| Surface # | 2 | 3 | 4 | 5 |
| k = | -5.75672E-01 | -4.03876E+02 | -1.50000E+02 | 5.08170E+00 |
| A4 = | 7.02762E-02 | 8.09881E-02 | 1.09515E-01 | 1.20810E-01 |
| A6 = | -3.38899E-02 | -5.20937E-01 | -6.76525E-01 | -2.55499E-01 |
| A8 = | 3.71070E-01 | 9.27692E-01 | 1.19357E+00 | 4.00229E-01 |
| A10 = | -7.10675E-01 | -1.82705E+00 | -1.81007E+00 | -2.29596E-02 |
| A12 = | 4.77426E-08 | 1.48611E-01 | 1.45547E-01 | 1.68368E-01 |
| A14 = | 4.43986E-08 | 4.33201E-08 | 4.32540E-08 | 4.30373E-08 |
| Surface # | 6 | 7 | 8 | 9 |
| k = | -1.30739E+01 | -5.13069E-02 | -1.25924E+01 | -7.09967E+00 |
| A4 = | -5.25212E-01 | -8.00855E-02 | -2.31506E-01 | -1.62263E-01 |
| A6 = | 7.10793E-02 | 1.29421E-01 | 1.17137E-01 | 6.32984E-02 |
| A8 = | 1.52544E-01 | -1.56192E-01 | -2.31099E-02 | -2.15360E-02 |
| A10= | -2.80616E-01 | 1.21439E-01 | 1.15947E-03 | 4.13294E-03 |
| A12 = | -3.01174E-01 |  | 1.28257E-04 | -2.43215E-04 |
| A14 = | -1.72078E-01 |  |  | -9.36992E-06 |

Fig.7

| TABLE 3 | | | | | | | |
|---|---|---|---|---|---|---|---|
| (Embodiment 2) | | | | | | | |
| f = 3.27 mm, Fno = 2.85, HFOV = 34.5 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.130 | | | | |
| 2 | Lens 1 | 1.22748 (ASP) | 0.391 | Plastic | 1.544 | 55.9 | 2.53 |
| 3 | | 10.00000 (ASP) | 0.129 | | | | |
| 4 | Lens 2 | 13.27440 (ASP) | 0.300 | Plastic | 1.650 | 21.4 | -4.58 |
| 5 | | 2.41109 (ASP) | 0.590 | | | | |
| 6 | Lens 3 | -2.49739 (ASP) | 0.623 | Plastic | 1.530 | 55.8 | 27.47 |
| 7 | | -2.31587 (ASP) | 0.273 | | | | |
| 8 | Lens 4 | 1.13695 (ASP) | 0.643 | Plastic | 1.530 | 55.8 | 25.51 |
| 9 | | 0.99818 (ASP) | 0.400 | | | | |
| 10 | IR-filter | Plano | 0.300 | Glass | 1.517 | 64.2 | - |
| 11 | | Plano | 0.427 | | | | |
| 12 | Image | Plano | - | | | | |
| Note: Reference wavelength is d-line(587.6 nm) | | | | | | | |

Fig.8

| TABLE 4 | | | | |
|---|---|---|---|---|
| Aspheric Coefficients | | | | |
| Surface # | 2 | 3 | 4 | 5 |
| k = | -7.27101E-01 | -1.74699E+02 | -1.40718E+00 | 4.76559E+00 |
| A4 = | 7.95861E-02 | 6.55887E-02 | 8.52529E-03 | 3.86043E-02 |
| A6 = | 3.48797E-02 | -2.52468E-01 | -3.16176E-01 | -5.60712E-02 |
| A8 = | 1.11607E-01 | 8.28136E-01 | 8.69069E-01 | 1.24285E-01 |
| A10 = | -4.91501E-02 | -1.13883E+00 | -1.25249E+00 | -2.82462E-02 |
| A12 = | 7.80796E-07 | 1.48611E-01 | 1.45547E-01 | 1.68368E-01 |
| A14 = | 6.94528E-07 | 7.08165E-07 | 7.05754E-07 | 7.01825E-07 |
| Surface # | 6 | 7 | 8 | 9 |
| k = | -4.01170E+01 | 1.32206E+00 | -3.56859E+00 | -2.99829E+00 |
| A4 = | -2.51915E-01 | -2.66979E-01 | -2.54385E-01 | -1.37460E-01 |
| A6 = | 5.37814E-03 | 1.89903E-01 | 1.12636E-01 | 6.32933E-02 |
| A8 = | -2.15713E-01 | -1.64495E-01 | -2.12100E-02 | -2.03779E-02 |
| A10= | 2.85092E-01 | 8.36656E-02 | 1.67594E-03 | 3.74159E-03 |
| A12 = | -2.20826E-01 | -3.07049E-02 | -2.49190E-05 | -3.23333E-04 |
| A14 = | -1.75337E-01 | -8.39955E-04 | | 9.08009E-06 |

Fig.9

| TABLE 5 | | | | | | | |
|---|---|---|---|---|---|---|---|
| (Embodiment 3) | | | | | | | |
| f = 3.87 mm, Fno = 2.85, HFOV = 30.3 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.180 | | | | |
| 2 | Lens 1 | 1.26878 (ASP) | 0.448 | Plastic | 1.544 | 55.9 | 2.50 |
| 3 | | 16.64510 (ASP) | 0.086 | | | | |
| 4 | Lens 2 | 7.97210 (ASP) | 0.304 | Plastic | 1.650 | 21.4 | -4.64 |
| 5 | | 2.15355 (ASP) | 0.507 | | | | |
| 6 | Lens 3 | -2.48982 (ASP) | 0.671 | Plastic | 1.514 | 56.8 | 5.41 |
| 7 | | -1.43278 (ASP) | 0.523 | | | | |
| 8 | Lens 4 | -37.41790 (ASP) | 0.946 | Plastic | 1.530 | 55.8 | -3.81 |
| 9 | | 2.15513 (ASP) | 0.344 | | | | |
| 10 | IR-filter | Plano | 0.300 | Glass | 1.517 | 64.2 | - |
| 11 | | Plano | 0.306 | | | | |
| 12 | Image | Plano | - | | | | |
| Note: Reference wavelength is d-line(587.6 nm) | | | | | | | |

Fig.10

| TABLE 6 | | | | |
|---|---|---|---|---|
| Aspheric Coefficients | | | | |
| Surface # | 2 | 3 | 4 | 5 |
| k   = | -7.83884E-01 | -2.97470E+02 | 4.49281E+01 | 4.82848E+00 |
| A4 = | 7.53717E-02 | 5.46867E-02 | 1.11682E-02 | 1.76628E-02 |
| A6 = | 1.19721E-02 | -2.15702E-01 | -2.39699E-01 | -1.72327E-02 |
| A8 = | 8.64609E-02 | 8.08176E-01 | 8.78208E-01 | 2.54744E-01 |
| A10 = | 3.40404E-02 | -9.22260E-01 | -1.21798E+00 | -3.60842E-01 |
| A12 = | 3.69030E-05 | 1.48611E-01 | 1.45527E-01 | 1.68823E-01 |
| A14 = | 2.52034E-07 | 2.10933E-07 | -5.14248E-08 | 1.09939E-07 |
| Surface # | 6 | 7 | 8 | 9 |
| k   = | -8.58246E+00 | 8.16575E-01 | -1.00000E+00 | -4.21607E+00 |
| A4 = | -2.46390E-01 | -1.27688E-01 | -2.77751E-01 | -1.36481E-01 |
| A6 = | 1.63315E-02 | 1.32690E-01 | 1.08887E-01 | 5.73362E-02 |
| A8 = | -3.07676E-01 | -1.46496E-01 | -2.27646E-02 | -1.95890E-02 |
| A10= | 3.33204E-01 | 1.05898E-01 | 9.63939E-05 | 3.77287E-03 |
| A12 = | -2.03507E-01 | -3.41125E-02 | -2.03465E-07 | -3.67225E-04 |
| A14 = | -1.49124E-01 | 7.05483E-03 | | 1.39433E-05 |

Fig.11

| TABLE 7 | | | | | | | |
|---|---|---|---|---|---|---|---|
| (Embodiment 4) | | | | | | | |
| f = 3.40 mm, Fno = 2.85, HFOV = 33.8 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.120 | | | | |
| 2 | Lens 1 | 1.33123 (ASP) | 0.388 | Plastic | 1.544 | 55.9 | 2.70 |
| 3 | | 12.50000 (ASP) | 0.301 | | | | |
| 4 | Lens 2 | 9.25000 (ASP) | 0.300 | Plastic | 1.650 | 21.4 | -5.02 |
| 5 | | 2.38084 (ASP) | 0.521 | | | | |
| 6 | Lens 3 | -1.70940 (ASP) | 0.857 | Plastic | 1.544 | 55.9 | 4.71 |
| 7 | | -1.20611 (ASP) | 0.089 | | | | |
| 8 | Lens 4 | 1.34418 (ASP) | 0.534 | Plastic | 1.544 | 55.9 | -7.97 |
| 9 | | 0.88250 (ASP) | 0.330 | | | | |
| 10 | IR-filter | Plano | 0.300 | Glass | 1.517 | 64.2 | - |
| 11 | | Plano | 0.687 | | | | |
| 12 | Image | Plano | - | | | | |
| Note: Reference wavelength is d-line(587.6 nm) | | | | | | | |

Fig.12

| TABLE 8A | | | | |
|---|---|---|---|---|
| Aspheric Coefficients | | | | |
| Surface # | 2 | 3 | 4 | 5 |
| k = | -8.97224E-01 | -3.00000E-02 | -7.38696E+01 | 2.87713E+00 |
| A4 = | 4.92505E-02 | 7.97133E-03 | 5.65782E-03 | 6.87796E-02 |
| A6 = | -7.73062E-02 | -3.00315E-01 | -3.96671E-01 | -2.11201E-01 |
| A8 = | 3.25508E-01 | 7.50759E-01 | 8.93544E-01 | 4.27467E-01 |
| A10 = | -7.76880E-01 | -1.53259E-00 | -1.28096E+00 | -4.12590E-01 |
| A12 = | -1.81004E-07 | 1.48611E-01 | 1.45547E-01 | 1.63186E-01 |
| A14 = | -1.54345E-07 | -1.67105E-07 | -1.42713E-07 | -1.70665E-07 |
| Surface # | 6 | 7 | 9 | |
| k = | -1.54869E+01 | -4.95659E-02 | -3.83657E+00 | |
| A4 = | -2.56629E-01 | -9.11688E-02 | -1.57701E-01 | |
| A6 = | -3.27899E-02 | 1.74772E-01 | 6.60009E-02 | |
| A8 = | -2.28719E-01 | -1.80421E-01 | -2.11917E-02 | |
| A10= | 3.23707E-01 | 8.89098E-02 | 3.81839E-03 | |
| A12 = | -3.01174E-01 | -1.58197E-02 | -3.26131E-04 | |
| A14 = | -1.72078E-01 | -2.38363E-03 | 3.87890E-06 | |

Fig.13A

| TABLE 8B | |
|---|---|
| Aspheric Coefficients | |
| Surface # | 8 |
| k = | -7.34072E+00 |
| A1 = | |
| A2 = | |
| A3 = | |
| A4 = | -2.23112E-01 |
| A5 = | |
| A6 = | 1.05696E-01 |
| A7 = | |
| A8 = | -2.25642E-02 |
| A9= | |
| A10= | 1.77833E-03 |
| A11= | |
| A12= | 3.29028E-06 |

Fig.13B

| TABLE 9 | | | | | | | |
|---|---|---|---|---|---|---|---|
| (Embodiment 5) | | | | | | | |
| f = 3.82 mm, Fno = 2.85, HFOV = 30.4 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.180 | | | | |
| 2 | Lens 1 | 1.19288 (ASP) | 0.468 | Plastic | 1.544 | 55.9 | 2.31 |
| 3 | | 20.00000 (ASP) | 0.080 | | | | |
| 4 | Lens 2 | 20.00000 (ASP) | 0.300 | Plastic | 1.632 | 23.4 | -3.85 |
| 5 | | 2.15613 (ASP) | 0.783 | | | | |
| 6 | Lens 3 | -1.22359 (ASP) | 0.604 | Plastic | 1.544 | 55.9 | 9.12 |
| 7 | | -1.15238 (ASP) | 0.122 | | | | |
| 8 | Lens 4 | 1.38560 (ASP) | 0.443 | Plastic | 1.544 | 55.9 | -15.42 |
| 9 | | 1.05528 (ASP) | 0.298 | | | | |
| 10 | IR-filter | Plano | 0.300 | Glass | 1.517 | 64.2 | - |
| 11 | | Plano | 0.993 | | | | |
| 12 | Image | Plano | - | | | | |
| Note: Reference wavelength is d-line(587.6 nm) | | | | | | | |

Fig.14

| TABLE 10 | | | | |
|---|---|---|---|---|
| Aspheric Coefficients | | | | |
| Surface # | 2 | 3 | 4 | 5 |
| k = | -5.58598E-01 | -9.91441E+02 | -1.50000E+02 | 4.39626E+00 |
| A4 = | 7.26618E-02 | 9.71878E-02 | 1.09554E-01 | 1.13557E-01 |
| A6 = | -7.80334E-02 | -5.18123E-01 | -6.32110E-01 | -2.45742E-01 |
| A8 = | 3.59416E-01 | 9.36806E-01 | 1.16097E+00 | 5.25862E-01 |
| A10 = | -4.66357E-01 | -1.25206E+00 | -1.28392E+00 | -2.21884E-01 |
| A12 = | -2.32638E-07 | 1.48611E-01 | 1.45547E-01 | 1.68368E-01 |
| A14 = | -2.12224E-07 | -2.16334E-07 | -2.12764E-07 | -2.16164E-07 |
| Surface # | 6 | 7 | 8 | 9 |
| k = | -9.37548E+00 | -7.45941E-02 | -1.07259E+01 | -5.96735E+00 |
| A4 = | -4.32903E-01 | -9.69844E-02 | -2.26451E-01 | -1.59059E-01 |
| A6 = | -4.18522E-02 | 1.31461E-01 | 1.13949E-01 | 6.55517E-02 |
| A8 = | -1.80111E-02 | -1.62887E-01 | -2.37111E-02 | -2.14067E-02 |
| A10= | 1.18608E-01 | 1.06358E-01 | 1.09886E-03 | 4.13474E-03 |
| A12 = | -3.01174E-01 | -1.06784E-02 | 7.56727E-05 | -2.83282E-04 |
| A14 = | -1.72078E-01 | -3.79398E-03 | | -2.69240E-05 |

Fig.15

| TABLE 11 | | | | | |
|---|---|---|---|---|---|
| | Embodiment 1 | Embodiment 2 | Embodiment 3 | Embodiment 4 | Embodiment 5 |
| f | 3.54 | 3.27 | 3.87 | 3.40 | 3.82 |
| Fno | 2.85 | 2.85 | 2.85 | 2.85 | 2.85 |
| HFOV | 32.4 | 34.5 | 30.3 | 33.8 | 30.4 |
| N1 | 1.544 | 1.544 | 1.544 | 1.544 | 1.544 |
| V1-V2 | 32.5 | 34.5 | 34.5 | 34.5 | 32.5 |
| T12/T23 | 0.13 | 0.22 | 0.17 | 0.58 | 0.10 |
| R1/R2 | 0.05 | 0.12 | 0.08 | 0.11 | 0.06 |
| R4/R3 | 0.06 | 0.18 | 0.27 | 0.26 | 0.11 |
| f/f1 | 1.62 | 1.29 | 1.55 | 1.26 | 1.65 |
| f/f3 | 0.33 | 0.12 | 0.72 | 0.72 | 0.42 |
| |f/f4| | 0.12 | 0.13 | 1.02 | 0.43 | 0.25 |
| SAG32/Y32 | 0.62 | 0.55 | 0.60 | 0.76 | 0.69 |
| SL/TTL | 0.96 | 0.97 | 0.96 | 0.97 | 0.96 |
| TTL/ImgH | 1.78 | 1.75 | 1.91 | 1.86 | 1.89 |

Fig.16

OPTICAL IMAGING LENS SYSTEM

CROSS-REFERENCE TO RELATED PATENT APPLICATION

This non-provisional application claims priority under 35 U.S.C. §119(a) on Taiwanese Patent Application No(s). 099133980 filed in Taiwan, R.O.C., on Oct. 6, 2010, the entire contents of which are hereby incorporated by reference.

BACKGROUND OF THE INVENTION

1. Field of the Invention

The present invention relates to an optical imaging lens system, and more particularly, to a compact optical imaging lens system used in an electronic product.

2. Description of the Prior Art

The demand for compact imaging lenses has grown in recent years as the popularity of portable electronic products with the photographing function has increased, and the sensor of a general photographing camera is none other than CCD (Charge Coupled Device) or CMOS (Complementary Metal Oxide Semiconductor Sensor). Furthermore, as advanced semiconductor manufacturing technology has allowed the pixel size of sensors to be reduced, and the resolution of compact imaging lens element has gradually increased, there is an increasing demand for compact imaging lens system featuring better image quality.

A conventional compact imaging lens for portable electronic products generally comprises three lens elements. The lens system, as the one disclosed in U.S. Pat. No. 7,145,736, in order from an object side to an image side includes a first lens element with positive refractive power, a second lens elements with negative refractive power and a third lens elements with positive refractive power. With the advance of semiconductor manufacturing technology and the trend of design toward compact in electronic products, the pixel size of sensors become smaller and the standard of requirement for image quality become higher. Therefore, the conventional systems of three lens elements no longer satisfy the higher level camera modules.

U.S. Pat. No. 7,365,920 discloses a four lens elements system, wherein two spherical-surface glass lenses serving as the first and second lens elements are adhered together to form a doublet for correcting the chromatic aberration. Such an arrangement of optical elements, however, has the following disadvantages: (1) the degrees of freedom of the system is curtailed due to the excessive employment of spherical-surface glass lenses, thus the total track length of the system is hard to be reduced; (2) the process of adhering glass lenses together is complicated, posing difficulties in manufacture.

Therefore, a need exists in the art for an optical image lens system that features better image quality, maintains a moderate total track length and is applicable to compact portable electronic products.

SUMMARY OF THE INVENTION

The present invention provides an optical imaging lens system, in order from an object side to an image side comprising: a first lens element with positive refractive power having a convex object-side surface and a concave image-side surface; a second lens element with negative refractive power having a convex object-side surface and a concave image-side surface; a third lens element with positive refractive power; and a fourth lens element having a concave image-side surface, and at least one of the object-side and image-side surfaces thereof being aspheric; wherein the optical imaging lens system further comprises an aperture stop and an electronic sensor on which an object is imaged, and the aperture stop is positioned between an object and the first lens element; wherein there are four lens elements with refractive power; wherein a focal length of the optical imaging lens system is f, a focal length of the third lens element is f3, a focal length of the fourth lens element is f4, an on-axis spacing between the first lens element and the second lens element is T12, an on-axis spacing between the second lens element and the third lens element is T23, a distance on the optical axis between the aperture stop and the electronic sensor is SL, a distance on the optical axis between the object-side surface of the first lens element and the electronic sensor is TTL, and they satisfy the relation: $0<f/f3<0.9$; $|f/f4|<0.75$; $0<T12/T23<0.6$; and $0.9<SL/TTL<1.2$.

On the other hand, the present invention provides an optical imaging lens system, in order from an object side to an image side comprising: a first lens element with positive refractive power having a convex object-side surface and a concave image-side surface; a second lens element with negative refractive power having a convex object-side surface and a concave image-side surface; a third lens element with positive refractive power having a concave object-side surface and a convex image-side surface; and a fourth lens element with negative refractive power having a concave image-side surface, and at least one of the object-side and image-side surfaces thereof being aspheric; wherein the optical imaging lens system further comprises an aperture stop and an electronic sensor on which an object is imaged, and the aperture stop is positioned between an object and the first lens element; wherein there are four lens elements with refractive power; wherein a radius of curvature of the image-side surface of the second lens element is R4, a radius of curvature of the object-side surface of the second lens element is R3, a distance on the optical axis between the aperture stop and the electronic sensor is SL, a distance on the optical axis between the object-side surface of the first lens element and the electronic sensor is TTL, and they satisfy the relation: $0<R4/R3<0.3$; and $0.9<SL/TTL<1.2$.

By such arrangement, the total track length and the photosensitivity of the optical imaging lens system can be effectively reduced while retaining high image quality.

In an optical imaging lens system of the present invention, the first lens element has positive refractive power, which provides part of the refractive power for the system and helps to reduce the total track length of the lens system. The second lens element has negative refractive power, which allows the aberration produced by the first lens element with positive refractive power to be effectively corrected, as well as allows the chromatic aberration of the system to be favorably corrected. The third lens element has positive refractive power, which allows the refractive power of the first lens element to be favorably distributed and the sensitivity of the system can be reduced. The fourth lens element may have either negative or positive refractive power. When the fourth lens element has positive refractive power, the high-order aberration can be effectively corrected and the image resolution of the optical imaging lens system can be improved; when the fourth lens element has negative refractive power, the principal point of the optical system can be positioned even farther away from the image plane to reduce the total track length of the system and keep the system compact.

In an optical imaging lens system of the present invention, the first lens element is a meniscus lens element having a convex object-side surface and a concave image-side surface; and thereby the astigmatism of the system can be corrected favorably. The second lens element has a convex object-side surface and a concave image-side surface; and thereby the aberration produced by the first lens element can be corrected favorably. When the third lens element is a meniscus lens element having a concave object-side surface and a convex image-side surface, the astigmatism and the high-order aberration of the system can be corrected favorably; The fourth lens element has a concave image-side surface, which positions the principal point of the optical system away from the image plane thereby reducing the total optical track length of the system; when the fourth lens element has a convex object-side surface and a concave image-side surface, the astigmatism and the high-order aberration of the system can be corrected favorably.

In an optical imaging lens system of the present invention, the aperture stop can be positioned between the object and the first lens element. In the favor of the positive refractive power provided by the first lens element and positioning the aperture stop near the side of the object of the system, the total track length of the optical imaging lens system can be effectively reduced. Moreover, by the aforementioned arrangement, the exit pupil of the optical imaging lens system can be positioned away from the image plane. Therefore, light will be projected onto the electronic sensor at a nearly perpendicular angle as telecentricity of the image side. The telecentricity is very important to the photosensitivity of the solid-state sensor as it can improve the photosensitivity of the sensor and reduce the probability of the shading occurrence. Furthermore, the fourth lens element can be provided with at least one inflection point, thereby the angle at which the light is projected onto the sensor from the off-axis field can be effectively reduced to further correct the off-axis aberration.

BRIEF DESCRIPTION OF THE DRAWINGS

FIG. 6 is TABLE 1 which lists the optical data of the first embodiment.

FIG. 7 is TABLE 2 which lists the aspheric surface data of the first embodiment.

FIG. 8 is TABLE 3 which lists the optical data of the second embodiment.

FIG. 9 is TABLE 4 which lists the aspheric surface data of the second embodiment.

FIG. 10 is TABLE 5 which lists the optical data of the third embodiment.

FIG. 11 is TABLE 6 which lists the aspheric surface data of the third embodiment.

FIG. 12 is TABLE 7 which lists the optical data of the fourth embodiment.

FIG. 13 is TABLE 8 which lists the aspheric surface data of the fourth embodiment.

FIG. 14 is TABLE 9 which lists the optical data of the fifth embodiment.

FIG. 15 is TABLE 10 which lists the aspheric surface data of the fifth embodiment.

FIG. 16 is TABLE 11 which lists the data of the respective embodiments resulting from the equations.

DETAILED DESCRIPTION OF THE PREFERRED EMBODIMENTS

Figure 1A:
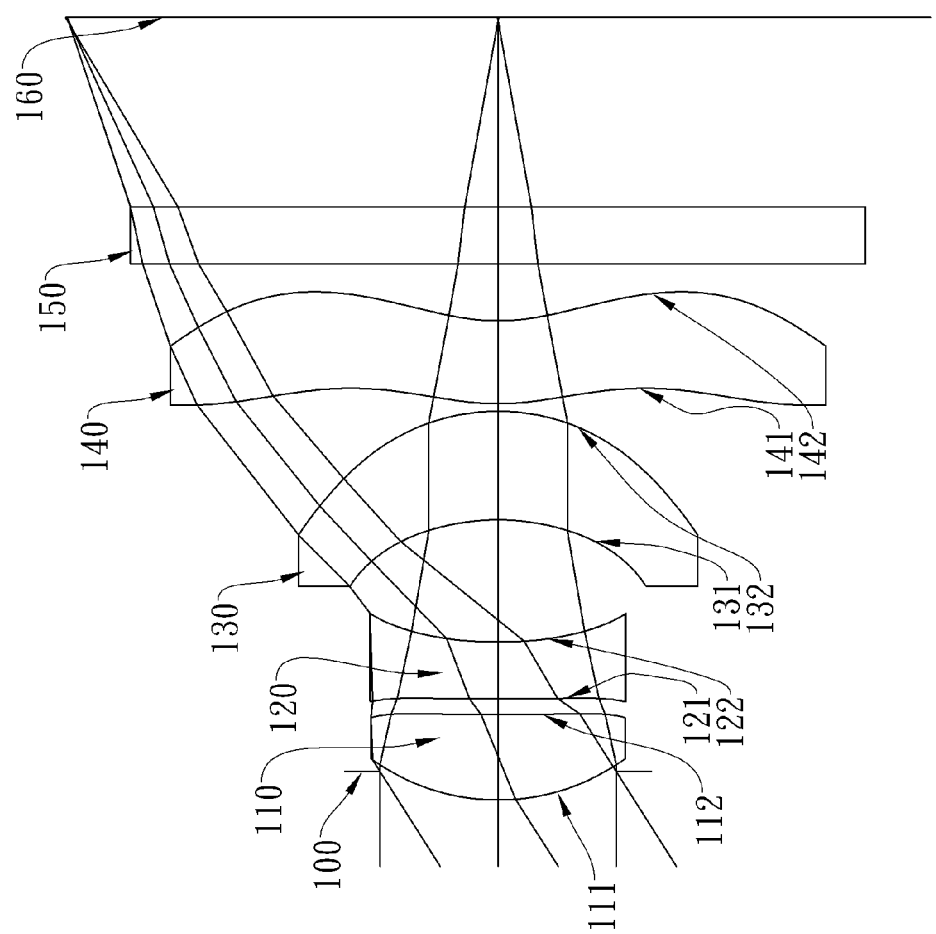
FIG. 1A shows an optical imaging lens system in accordance with a first embodiment of the present invention.

The present invention provides an optical imaging lens system, in order from an object side to an image side comprising: a first lens element with positive refractive power having a convex object-side surface and a concave image-side surface; a second lens element with negative refractive power having a convex object-side surface and a concave image-side surface; a third lens element with positive refractive power; and a fourth lens element having a concave image-side surface, and at least one of the object-side and image-side surfaces thereof being aspheric; wherein the optical imaging lens system further comprises an aperture stop and an electronic sensor on which an object is imaged, and the aperture stop is positioned between an object and the first lens element; wherein there are four lens elements with refractive power; wherein a focal length of the optical imaging lens system is f, a focal length of the third lens element is f3, a focal length of the fourth lens element is f4, an on-axis spacing between the first lens element and the second lens element is T12, an on-axis spacing between the second lens element and the third lens element is T23, a distance on the optical axis between the aperture stop and the electronic sensor is SL, a distance on the optical axis between the object-side surface of the first lens element and the electronic sensor is TTL, and they satisfy the relation: $0<f/f3<0.9$; $|f/f4|<0.75$; $0<T12/T23<0.6$; and $0.9<SL/TTL<1.2$.

When the relation of $0<f/f3<0.9$ is satisfied, the positive refractive power of the first lens element can be effectively distributed for reducing the sensitivity of the system; preferably, the following relation is satisfied: $0<f/f3<0.75$; more preferably, the following relation is satisfied: $0<f/f3<0.5$. When the relation of $|f/f4|<0.75$ is satisfied, the principal point of the optical system can be positioned even farther away from the image plane to reduce the total track length of the system and keep the system compact; preferably, the following relation is satisfied: $|f/f4|<0.5$. When the relation of $0<T12/T23<0.6$ is satisfied, the space between lens elements of the lens system is not large or small excessively. Consequently, it is not only favorable for lens assembly process, but also more efficient in the usage of space for keeping the system compact; preferably, the following relation is satisfied: $0<T12/T23<0.27$. When the relation of $0.9<SL/TTL<1.2$ is satisfied, a good balance between the telecentricity and the wide field of view of the lens system can be favorably achieved.

In the aforementioned optical imaging lens system, it is preferable that at least one inflection point is formed on at least one surface of the object-side and image-side surfaces of the fourth lens element, and thereby the angle at which the light is projected onto the sensor from the off-axis field can be effectively reduced to further correct the off-axis aberration;

preferably, the fourth lens element is made of plastic for reducing the weight of lens system and cutting down the production cost effectively.

In the aforementioned optical imaging lens system, a refractive index of the first lens element is N1, and they preferably satisfy the relation: 1.4<N1<1.6. When the above relation is satisfied, the ability of the system for correcting the astigmatism thereof can be effectively improved.

In the aforementioned optical imaging lens system, a radius of curvature of the image-side surface of the second lens element is R4, a radius of curvature of the object-side surface of the second lens element is R3, and they preferably satisfy the relation: 0<R4/R3<0.3. When the above relation is satisfied, the aberration resulted from the first lens element can be favorably corrected, and the refractive power of the second lens element is not too large so that production of the high-order aberration is prevented.

In the aforementioned optical imaging lens system, a vertical distance between a maximum effective diameter position on the image-side surface of the third lens element and the optical axis is Y32, a distance in parallel with the optical axis from the maximum effective diameter position on the image-side surface of the third lens element to the on-axis vertex on the image-side surface of the third lens element is SAG32, and they preferably satisfy the relation: 0.5<SAG32/Y32<0.8. When the above relation is satisfied, the shape of the third lens element is not too bent, which is good for fabrication and formation of lens elements. The space needed for arranging the lens elements of the system is further reduced so that the arrangement of the system can be more compact.

In the aforementioned optical imaging lens system, a focal length of the optical imaging lens system is f, a focal length of the first lens element is f1, and they preferably satisfy the relation: 1.2<f/f1<1.7. When the above relation is satisfied, the arrangement of the refractive power of the first lens element is more in balance so that the total optical track length of the system can be effectively controlled and the high-order spherical aberration can be prevented at the same time.

In the aforementioned optical imaging lens system, an Abbe number of the first lens element is V1, an Abbe number of the second lens element is V2, and they preferably satisfy the relation: 30<V1−V2<42. When the above relation is satisfied, the chromatic aberration of the system can be favorably corrected.

In the aforementioned optical imaging lens system, a radius of curvature of the object-side surface of the first lens element is R1, a radius of curvature of the image-side surface of the first lens element is R2, and they preferably satisfy the relation: 0<R1/R2<0.2. When the above relation is satisfied, the spherical aberration can be favorably corrected. Moreover, since reduction of the total track length of the system is effected by the first lens element, the satisfaction of the above relation is also good for compacting of the lens system.

In the aforementioned optical imaging lens system, a distance on the optical axis between the object-side surface of the first lens element and the electronic sensor is TTL, half of the diagonal length of the effective pixel area of the electronic sensor is ImgH, and they preferably satisfy the relation: TTL/ImgH<1.95. The satisfaction of the above relation is favorably for keeping the optical imaging lens system compact so that the optical imaging lens system can be installed in compact and portable electronic products.

The present invention provides another optical imaging lens system, in order from an object side to an image side comprising: a first lens element with positive refractive power having a convex object-side surface and a concave image-side surface; a second lens element with negative refractive power having a convex object-side surface and a concave image-side surface; a third lens element with positive refractive power having a concave object-side surface and a convex image-side surface; and a fourth lens element with negative refractive power having a concave image-side surface, and at least one of the object-side and image-side surfaces thereof being aspheric; wherein the optical imaging lens system further comprises an aperture stop and an electronic sensor on which an object is imaged, and the aperture stop is positioned between an object and the first lens element; wherein there are four lens elements with refractive power; wherein a radius of curvature of the image-side surface of the second lens element is R4, a radius of curvature of the object-side surface of the second lens element is R3, a distance on the optical axis between the aperture stop and the electronic sensor is SL, a distance on the optical axis between the object-side surface of the first lens element and the electronic sensor is TTL, and they satisfy the relation: 0<R4/R3<0.3; and 0.9<SL/TTL<1.2.

When the relation of 0<R4/R3<0.3 is satisfied, the aberration resulted from the first lens element can be favorably corrected, and the refractive power of the second lens element is not too large so that the production of high-order aberration is prevented. When the relation of 0.9<SL/TTL<1.2 is satisfied, a good balance between the telecentricity and the wide field of view of the lens system can be favorably achieved.

In the aforementioned optical imaging lens system, it is preferable that at least one inflection point is formed on at least one surface of the object-side and image-side surfaces of the fourth lens element, and thereby the angle at which the light is projected onto the sensor from the off-axis field can be effectively reduced to further correct the off-axis aberration; preferably, the fourth lens element is made of plastic for reducing the weight of lens system and cutting down the production cost effectively.

In the aforementioned optical imaging lens system, it is preferable that at least one surface of the object-side and image-side surfaces of the third lens element is aspheric, and easily made into non-spherical profiles, allowing more design parameter freedom which can be used to reduce the aberration and the number of the lens elements. Consequently, the total track length of the optical imaging lens system can be effectively reduced.

In the aforementioned optical imaging lens system, a focal length of the optical imaging lens system is f, a focal length of the third lens element is f3, and they preferably satisfy the relation: 0<f/f3<0.9. When the above relation is satisfied, the positive refractive power of the first lens element can be effectively distributed for reducing the sensitivity of the system; more preferably, the following relation is satisfied: 0<f/f3<0.75.

In the aforementioned optical imaging lens system, an on-axis spacing between the first lens element and the second lens element is T12, an on-axis spacing between the second lens element and the third lens element is T23, and they preferably satisfy the relation: 0<T12/T23<0.6. When the above relation is satisfied, the space between lens elements of the lens system is not large or small excessively. Thereby, it is not only favorable for lens assembly process, but also more efficient in the usage of space for keeping the system compact, for keeping the system compact; more preferably, the following relation is satisfied: 0<T12/T23<0.27.

In the aforementioned optical imaging lens system, a focal length of the optical imaging lens system is f, a focal length of the fourth lens element is f4, and they preferably satisfy the relation: |f/f4|<0.5. When the above relation is satisfied, the principal point of the optical system can be positioned even farther away from the image plane to reduce the total track length of the system and keep the system compact.

In the aforementioned optical imaging lens system, an Abbe number of the first lens element is V1, an Abbe number of the second lens element is V2, and they preferably satisfy the relation: 30<V1−V2<42. When the above relation is satisfied, the chromatic aberration of the system can be favorably corrected.

In the aforementioned optical imaging lens system, the lens elements can be made of glass or plastic material. If the lens elements are made of glass, there is more freedom in distributing the refractive power of the optical system. If plastic material is adopted to produce the lens elements, the production cost will be reduced effectively. Additionally, the surfaces of the lens elements can be aspheric and easily made into non-spherical profiles, allowing more design parameter freedom which can be used to reduce the aberration and the number of the lens elements. Consequently, the total track length of the optical imaging lens system can be effectively reduced.

In the present optical imaging lens system, if a lens element has a convex surface, it means the portion of the surface in proximity to the optical axis is convex; if a lens element has a concave surface, it means the portion of the surface in proximity to the optical axis is concave.

Figure 17:
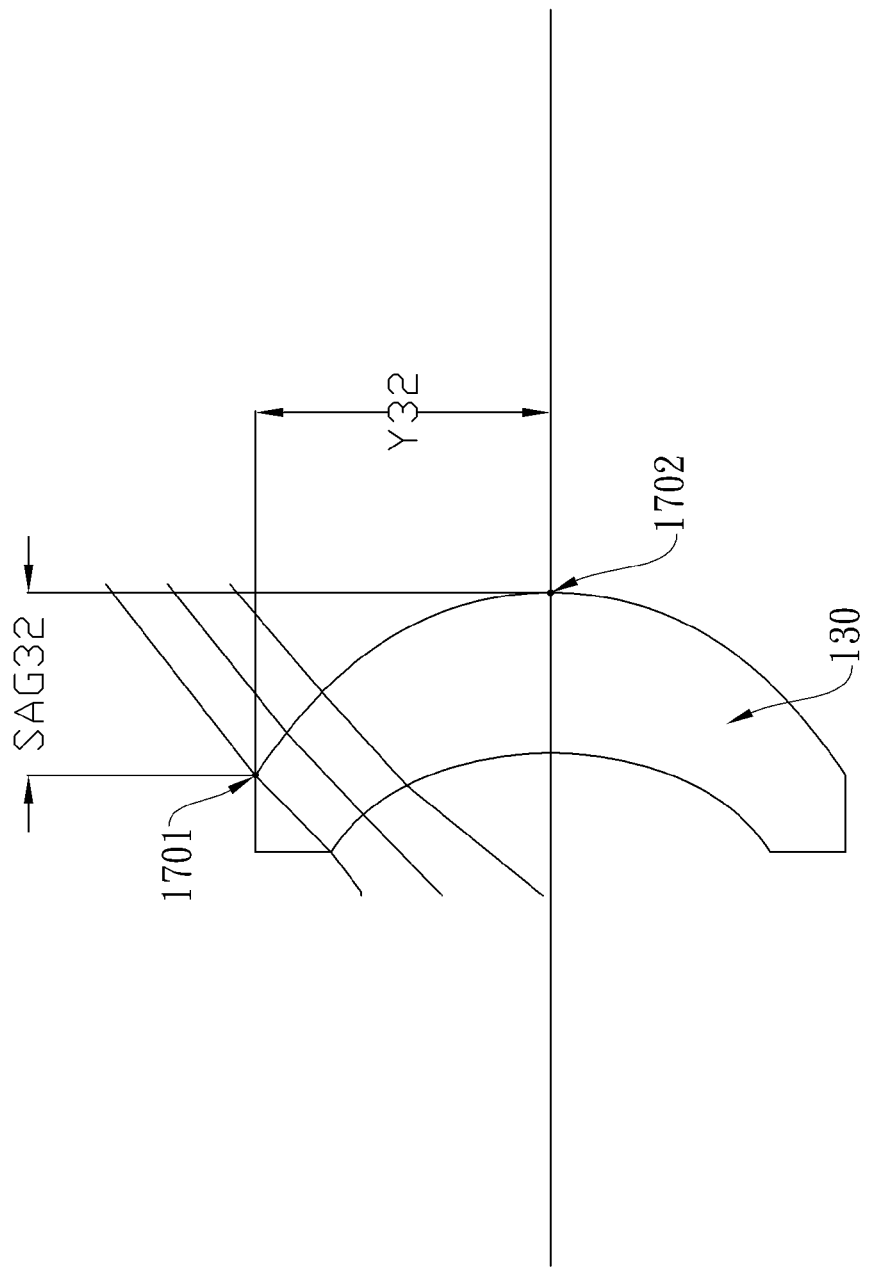
FIG. 17 shows the distances and relative locations represented by Y32 and SAG32.

In the aforementioned optical imaging lens system, a vertical distance between a maximum effective diameter position on the image-side surface of the third lens element and the optical axis is Y32, a distance in parallel with the optical axis from the maximum effective diameter position on the image-side surface of the third lens element to the on-axis vertex on the image-side surface of the third lens element is SAG32. Please refer to FIG. 17, the distance and relative locations represented by Y32 and SAG32 are further described. FIG. 17 is an enlarged drawing of the third lens element 130 of the first embodiment (which is described hereinafter) of the present invention, wherein the vertical distance between a maximum effective diameter position on the image-side surface 132 of the third lens element 130 and the optical axis is Y32, a distance between a site 1701, which has a distance of Y32 from the optical axis, on the image-side surface 132 of the third lens element 130 and a surface tangential to an apex 1702 of the optical axis of the lens is SAG32; in other words, in parallel with the optical axis from the maximum effective diameter position on the image-side surface 132 of the third lens element 130 to the on-axis vertex on the image-side surface 132 of the third lens element 130.

Preferred embodiments of the present invention will be described in the following paragraphs by referring to the accompanying drawings.

Embodiment 1

Figure 1B:
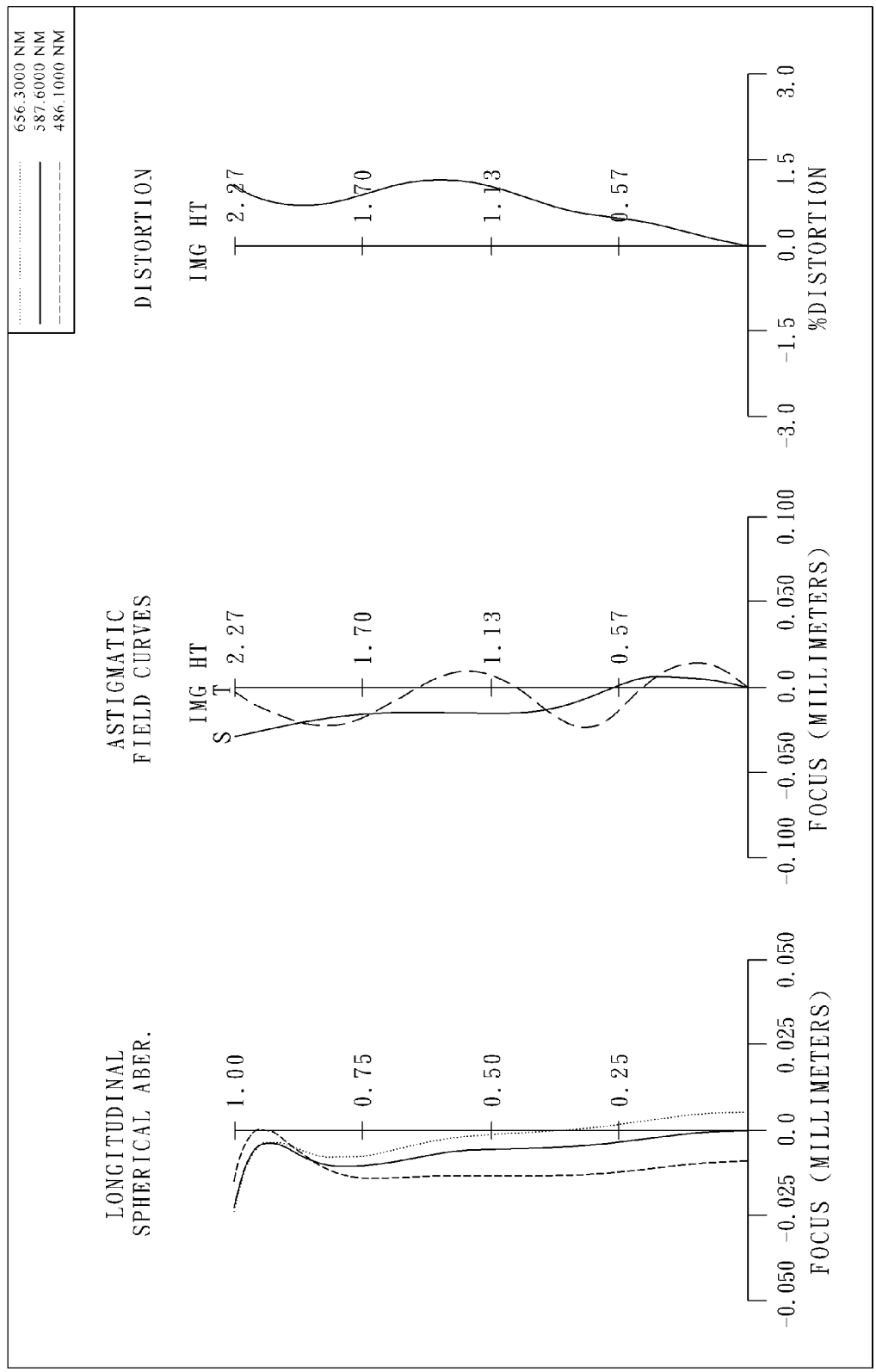
FIG. 1B shows the aberration curves of the first embodiment of the present invention.

FIG. 1A shows an optical imaging lens system in accordance with a first embodiment of the present invention, and FIG. 1B shows the aberration curves of the first embodiment of the present invention. The optical imaging lens system of the first embodiment of the present invention mainly comprises four lens elements, in order from an object side to an image side:

a plastic first lens element 110 with positive refractive power having a convex object-side surface 111 and a concave image-side surface 112, the object-side and image-side surfaces 111 and 112 thereof being aspheric;

a plastic second lens element 120 with negative refractive power having a convex object-side surface 121 and a concave image-side surface 122, the object-side and image-side surfaces 121 and 122 thereof being aspheric;

a plastic third lens element 130 with positive refractive power having a concave object-side surface 131 and a convex image-side surface 132, the object-side and image-side surfaces 131 and 132 thereof being aspheric; and a plastic fourth lens element 140 with negative refractive power having a convex object-side surface 141 and a concave image-side surface 142, the object-side and image-side surfaces 141 and 142 thereof being aspheric, and at least one inflection point is form on both the object-side and image-side surfaces 141 and 142 thereof;

wherein an aperture stop 100 is disposed between the object and the first lens element 110;

the optical imaging lens system further comprises an IR filter 150 disposed between the image-side surface 142 of the fourth lens element 140 and an image plane 160; an electronic sensor is further provided on the image plane 160; the IR filter 150 is made of glass and has no influence on the focal length of the optical imaging lens system.

The equation of the aspheric surface profiles is expressed as follows:

$$X(Y) = (Y^2/R)/\left(1 + sqrt(1 - (1+k)*(Y/R)^2)\right) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical imaging lens system, the focal length of the optical imaging lens system is f, and it satisfies the relation: f=3.54 (mm).

In the first embodiment of the present optical imaging lens system, the f-number of the optical imaging lens system is Fno, and it satisfies the relation: Fno=2.85.

In the first embodiment of the present optical imaging lens system, half of the maximal field of view of the optical imaging lens system is HFOV, and it satisfies the relation: HFOV=32.4 deg.

In the first embodiment of the present optical imaging lens system, the refractive index of the first lens element 110 is N1, and it satisfies the relation: N1=1.544.

In the first embodiment of the present optical imaging lens system, the Abbe number of the first lens element 110 is V1, the Abbe number of the second lens element 120 is V2, and they satisfy the relation: V1−V2=32.5.

In the first embodiment of the present optical imaging lens system, the on-axis spacing between the first lens element 110 and the second lens element 120 is T the on-axis spacing between the second lens element 120 and the third lens element 130 is T23, and they satisfy the relation: T12/T23=0.13.

In the first embodiment of the present optical imaging lens system, the radius of curvature of the object-side surface 111 of the first lens element 110 is R1, the radius of curvature of the image-side surface 112 of the first lens element 110 is R2, and they satisfy the relation: R1/R2=0.05.

In the first embodiment of the present optical imaging lens system, the radius of curvature of the image-side surface 122 of the second lens element 120 is R4, the radius of curvature of the object-side surface 121 of the second lens element 120 is R3 and they satisfy the relation: R4/R3=0.06.

In the first embodiment of the present optical imaging lens system, the focal length of the optical imaging lens system is f, the focal length of the first lens element 110 is f1, and they satisfy the relation: f/f1=1.62.

In the first embodiment of the present optical imaging lens system, the focal length of the optical imaging lens system is f, the focal length of the third lens element 130 is f3, and they satisfy the relation: f/f3=0.33.

In the first embodiment of the present optical imaging lens system, the focal length of the optical imaging lens system is f, the focal length of the fourth lens element 140 is f4, and they satisfy the relation: |f/f4|=0.12.

In the first embodiment of the present optical imaging lens system, the vertical distance between a maximum effective diameter position on the image-side surface 132 of the third lens element 130 and the optical axis is Y32, the distance in parallel with the optical axis from the maximum effective diameter position on the image-side surface 132 of the third lens element 130 to the on-axis vertex on the image-side surface 132 of the third lens element 130 is SAG32, and they satisfy the relation: SAG32/Y32=0.62.

In the first embodiment of the present optical imaging lens system, the distance on the optical axis between the aperture stop 100 and the electronic sensor is SL, the distance on the optical axis between the object-side surface 111 of the first lens element 100 and the electronic sensor is TTL, and they satisfy the relation: SL/TTL=0.96.

In the first embodiment of the present optical imaging lens system, the distance on the optical axis between the object-side surface 111 of the first lens element 110 and the electronic sensor is TTL, half of the diagonal length of the effective pixel area of the electronic sensor is ImgH, and they preferably satisfy the relation: TTL/ImgH=1.78.

The detailed optical data of the first embodiment is shown in FIG. 6 (TABLE 1), and the aspheric surface data is shown in FIG. 7 (TABLE 2), wherein the units of the radius of curvature, the thickness and the focal length are expressed in mm, and HFOV is half of the maximal field of view.

Embodiment 2

Figure 2A:
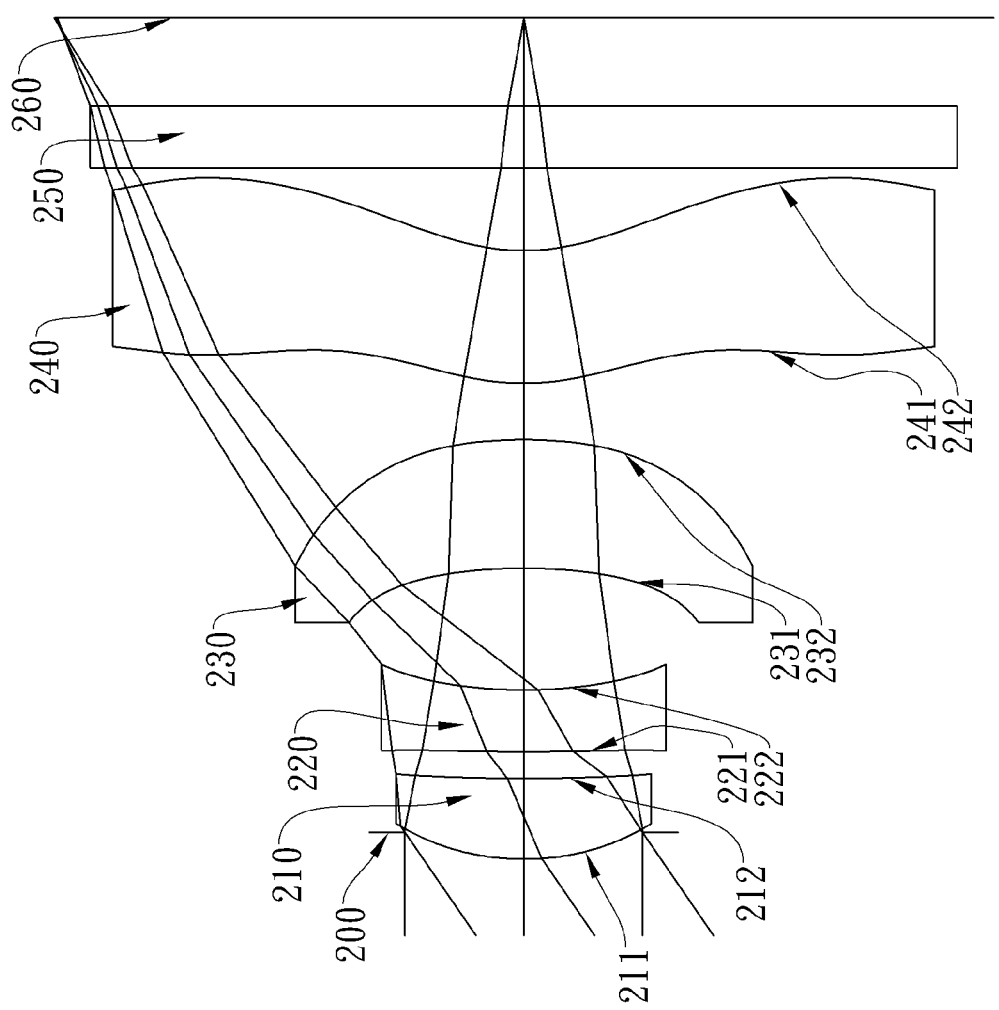
FIG. 2A shows an optical imaging lens system in accordance with a second embodiment of the present invention.
Figure 2B:
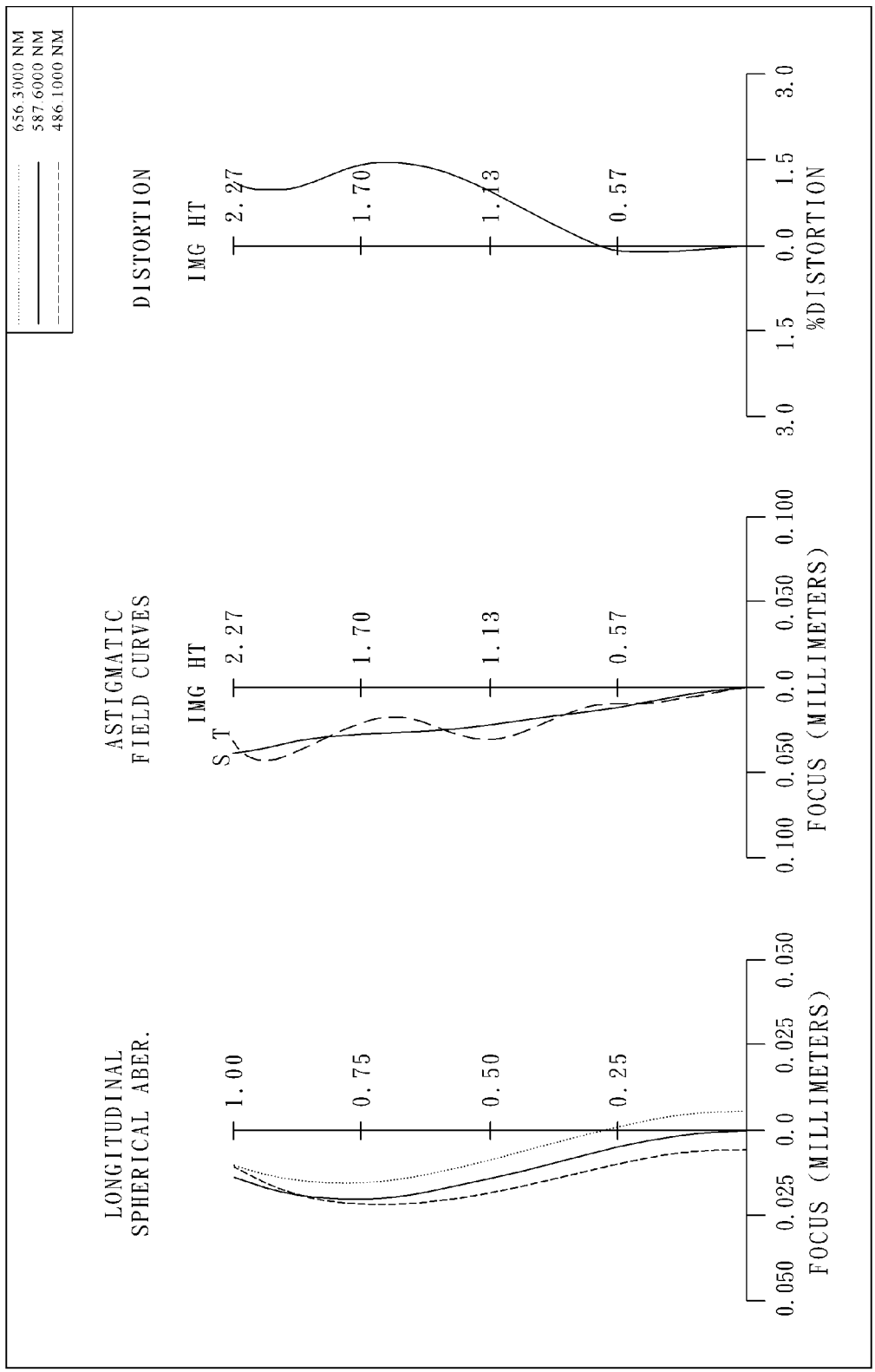
FIG. 2B shows the aberration curves of the second embodiment of the present invention.

FIG. 2A shows an optical imaging lens system in accordance with a second embodiment of the present invention, and FIG. 2B shows the aberration curves of the second embodiment of the present invention. The optical imaging lens system of the second embodiment of the present invention mainly comprises four lens elements, in order from an object side to an image side:

a plastic first lens element 210 with positive refractive power having a convex object-side surface 211 and a concave image-side surface 212, the object-side and image-side surfaces 211 and 212 thereof being aspheric;

a plastic second lens element 220 with negative refractive power having a convex object-side surface 221 and a concave image-side surface 222, the object-side and image-side surfaces 221 and 222 thereof being aspheric;

a plastic third lens element 230 with positive refractive power having a concave object-side surface 231 and a convex image-side surface 232, the object-side and image-side surfaces 231 and 232 thereof being aspheric; and a plastic fourth lens element 240 with positive refractive power having a convex object-side surface 241 and a concave image-side surface 242, the object-side and image-side surfaces 241 and 242 thereof being aspheric, and at least one inflection point is form on both the object-side and image-side surfaces 241 and 242 thereof;

wherein an aperture stop 200 is disposed between the object and the first lens element 210;

the optical imaging lens system further comprises an IR filter 250 disposed between the image-side surface 242 of the fourth lens element 240 and an image plane 260; an electronic sensor is further provided on the image plane 260; the IR filter 250 is made of glass and has no influence on the focal length of the optical imaging lens system.

The equation of the aspheric surface profiles of the second embodiment has the same form as that of the first embodiment.

In the second embodiment of the present optical imaging lens system, the focal length of the optical imaging lens system is f, and it satisfies the relation: f=3.27 (mm).

In the second embodiment of the present optical imaging lens system, the f-number of the optical imaging lens system is Fno, and it satisfies the relation: Fno=2.85.

In the second embodiment of the present optical imaging lens system, half of the maximal field of view of the optical imaging lens system is HFOV, and it satisfies the relation: HFOV=34.5 deg.

In the second embodiment of the present optical imaging lens system, the refractive index of the first lens element 210 is N1, and it satisfies the relation: N1=1.544.

In the second embodiment of the present optical imaging lens system, the Abbe number of the first lens element 210 is V1, the Abbe number of the second lens element 220 is V2, and they satisfy the relation: V1−V2=34.5.

In the second embodiment of the present optical imaging lens system, the on-axis spacing between the first lens element 210 and the second lens element 220 is T12, the on-axis spacing between the second lens element 220 and the third lens element 230 is T23, and they satisfy the relation: T12/T23=0.22.

In the second embodiment of the present optical imaging lens system, the radius of curvature of the object-side surface 211 of the first lens element 210 is R1, the radius of curvature of the image-side surface 212 of the first lens element 210 is R2, and they satisfy the relation: R1/R2=0.12.

In the second embodiment of the present optical imaging lens system, the radius of curvature of the image-side surface 222 of the second lens element 220 is R4, the radius of curvature of the object-side surface 221 of the second lens element 220 is R3, and they satisfy the relation: R4/R3=0.18.

In the second embodiment of the present optical imaging lens system, the focal length of the optical imaging lens system is f, the focal length of the first lens element 210 is f1, and they satisfy the relation: f/f1=1.29.

In the second embodiment of the present optical imaging lens system, the focal length of the optical imaging lens system is f, the focal length of the third lens element 230 is f3, and they satisfy the relation: f/f3=0.12.

In the second embodiment of the present optical imaging lens system, the focal length of the optical imaging lens system is f, the focal length of the fourth lens element 240 is f4, and they satisfy the relation: |f/f4|=0.13.

In the second embodiment of the present optical imaging lens system, the vertical distance between a maximum the image-side surface 232 of the third lens element 230 and the optical axis is Y32, the distance in parallel with the optical axis from the maximum effective diameter position on the image-side surface 232 of the third lens element 230 to the on-axis vertex on the image-side surface 232 of the third lens element 230 is SAG32, and they satisfy the relation: SAG32/Y32=0.55.

In the second embodiment of the present optical imaging lens system, the distance on the optical axis between the aperture stop 200 and the electronic sensor is SL, the distance on the optical axis between the object-side surface 211 of the first lens element 200 and the electronic sensor is TTL, and they satisfy the relation: SL/TTL=0.97.

In the second embodiment of the present optical imaging lens system, the distance on the optical axis between the object-side surface 211 of the first lens element 210 and the electronic sensor is TTL, half of the diagonal length of the effective pixel area of the electronic sensor is ImgH, and they preferably satisfy the relation: TTL/ImgH=1.75.

The detailed optical data of the second embodiment is shown in FIG. 8 (TABLE 3), and the aspheric surface data is shown in FIG. 9 (TABLE 4), wherein the units of the radius of curvature, the thickness and the focal length are expressed in mm, and HFOV is half of the maximal field of view.

Embodiment 3

Figure 3A:
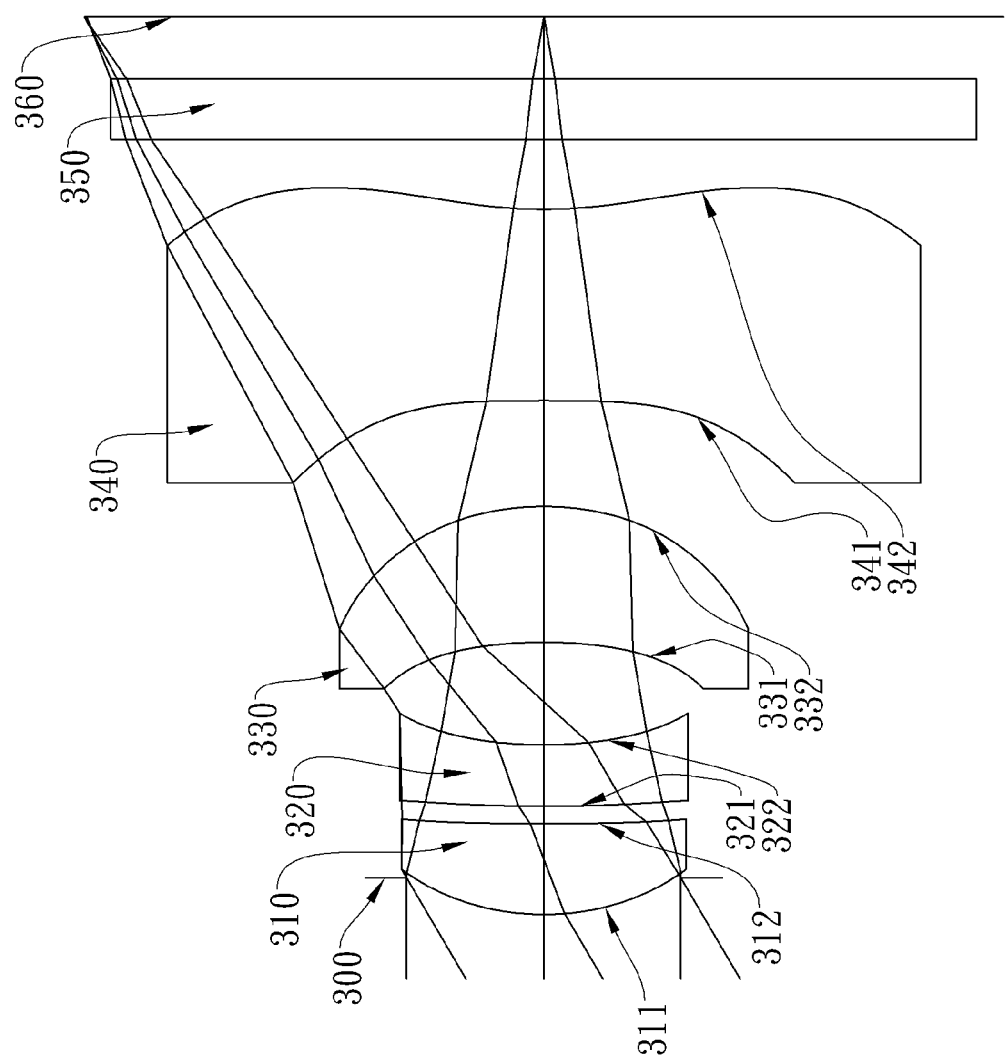
FIG. 3A shows an optical imaging lens system in accordance with a third embodiment of the present invention.
Figure 3B:
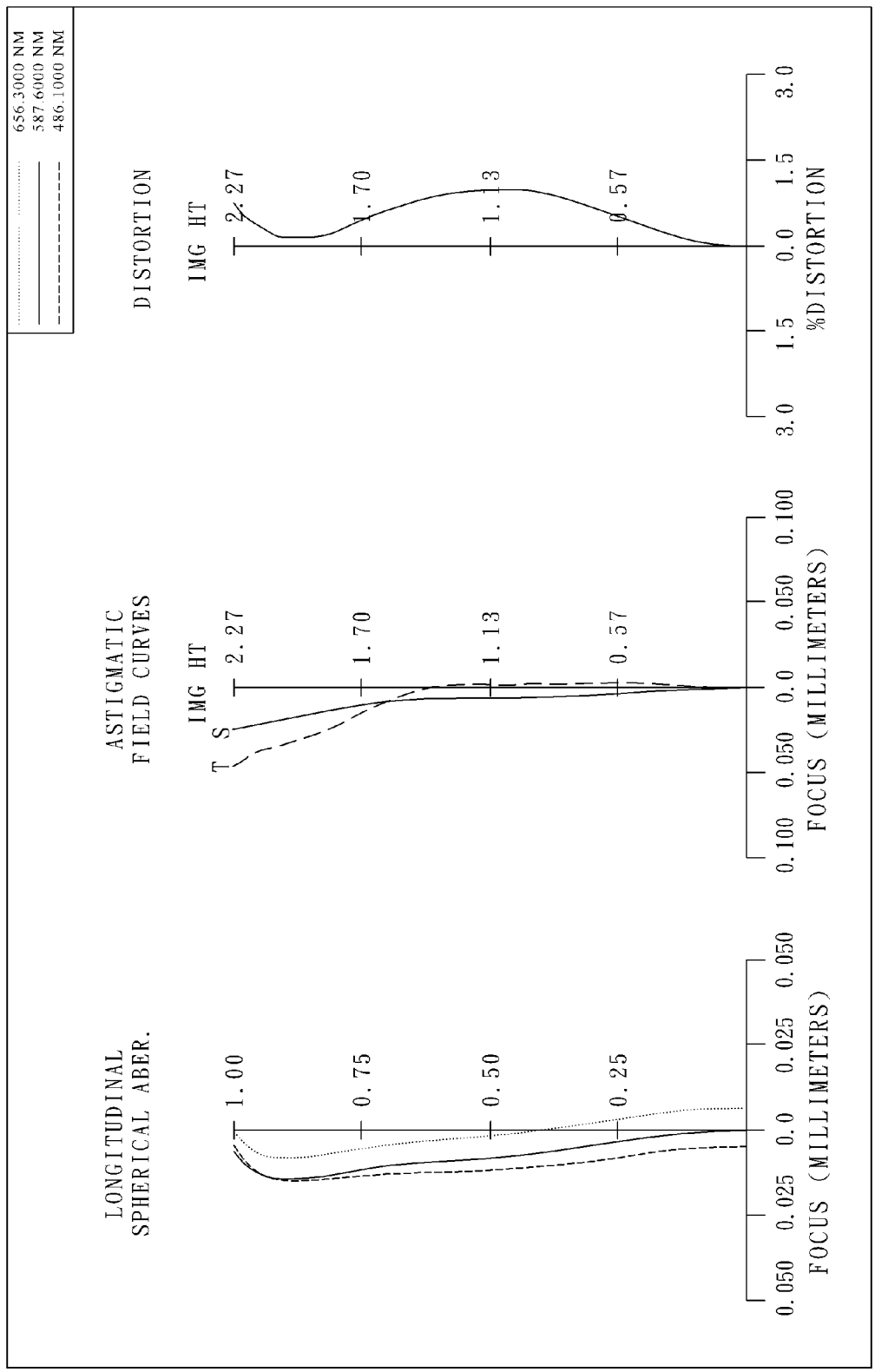
FIG. 3B shows the aberration curves of the third embodiment of the present invention.

FIG. 3A shows an optical imaging lens system in accordance with a third embodiment of the present invention, and FIG. 3B shows the aberration curves of the third embodiment of the present invention. The optical imaging lens system of the third embodiment of the present invention mainly comprises four lens elements, in order from an object side to an image side:

a plastic first lens element 310 with positive refractive power having a convex object-side surface 311 and a concave image-side surface 312, the object-side and image-side surfaces 311 and 312 thereof being aspheric;

a plastic second lens element 320 with negative refractive power having a convex object-side surface 321 and a concave image-side surface 322, the object-side and image-side surfaces 321 and 322 thereof being aspheric;

a plastic third lens element 330 with positive refractive power having a concave object-side surface 331 and a convex image-side surface 332, the object-side and image-side surfaces 331 and 332 thereof being aspheric; and a plastic fourth lens element 340 with negative refractive power having a concave object-side surface 341 and a concave image-side surface 342, the object-side and image-side surfaces 341 and 342 thereof being aspheric, and at least one inflection point is form on the image-side surface 342 thereof;

wherein an aperture stop 300 is disposed between the object and the first lens element 310;

the optical imaging lens system further comprises an IR filter 350 disposed between the image-side surface 342 of the fourth lens element 340 and an image plane 360; an electronic sensor is further provided on the image plane 360; the IR filter 350 is made of glass and has no influence on the focal length of the optical imaging lens system.

The equation of the aspheric surface profiles of the third embodiment has the same form as that of the first embodiment.

In the third embodiment of the present optical imaging lens system, the focal length of the optical imaging lens system is f, and it satisfies the relation: f=3.87 (mm).

In the third embodiment of the present optical imaging lens system, the f-number of the optical imaging lens system is Fno, and it satisfies the relation: Fno=2.85.

In the third embodiment of the present optical imaging lens system, half of the maximal field of view of the optical imaging lens system is HFOV, and it satisfies the relation: HFOV=30.3 deg.

In the third embodiment of the present optical imaging lens system, the refractive index of the first lens element 310 is N1, and it satisfies the relation: N1=1.544.

In the third embodiment of the present optical imaging lens system, the Abbe number of the first lens element 310 is V1, the Abbe number of the second lens element 320 is V2, and they satisfy the relation: V1−V2=34.5.

In the third embodiment of the present optical imaging lens system, the on-axis spacing between the first lens element 310 and the second lens element 320 is T12, the on-axis spacing between the second lens element 320 and the third lens element 330 is T23, and they satisfy the relation: T12/T23=0.17.

In the third embodiment of the present optical imaging lens system, the radius of curvature of the object-side surface 311 of the first lens element 310 is R1, the radius of curvature of the image-side surface 312 of the first lens element 310 is R2, and they satisfy the relation: R1/R2=0.08.

In the third embodiment of the present optical imaging lens system, the radius of curvature of the image-side surface 322 of the second lens element 320 is R4, the radius of curvature of the object-side surface 321 of the second lens element 320 is R3, and they satisfy the relation: R4/R3=0.27.

In the third embodiment of the present optical imaging lens system, the focal length of the optical imaging lens system is f, the focal length of the first lens element 310 is f1, and they satisfy the relation: f/f1=1.55.

In the third embodiment of the present optical imaging lens system, the focal length of the optical imaging lens system is f, the focal length of the third lens element 330 is f3, and they satisfy the relation: f/f3=0.72.

In the third embodiment of the present optical imaging lens system, the focal length of the optical imaging lens system is f, the focal length of the fourth lens element 340 is f4, and they satisfy the relation: |f/f4|=1.02.

In the third embodiment of the present optical imaging lens system, the vertical distance between a maximum effective diameter position on the image-side surface 332 of the third lens element 330 and the optical axis is Y32, the distance in parallel with the optical axis from the maximum effective diameter position on the image-side surface 332 of the third lens element 330 to the on-axis vertex on the image-side surface 332 of the third lens element 330 is SAG32, and they satisfy the relation: SAG32/Y32=0.60.

In the third embodiment of the present optical imaging lens system, the distance on the optical axis between the aperture stop 300 and the electronic sensor is SL, the distance on the optical axis between the object-side surface 311 of the first lens element 300 and the electronic sensor is TTL, and they satisfy the relation: SL/TTL=0.96.

In the third embodiment of the present optical imaging lens system, the distance on the optical axis between the object-side surface 311 of the first lens element 310 and the electronic sensor is TTL, half of the diagonal length of the effective pixel area of the electronic sensor is ImgH, and they preferably satisfy the relation: TTL/ImgH=1.91.

The detailed optical data of the third embodiment is shown in FIG. 10 (TABLE 5), and the aspheric surface data is shown in FIG. 11 (TABLE 6), wherein the units of the radius of curvature, the thickness and the focal length are expressed in mm, and HFOV is half of the maximal field of view.

Embodiment 4

Figure 4A:
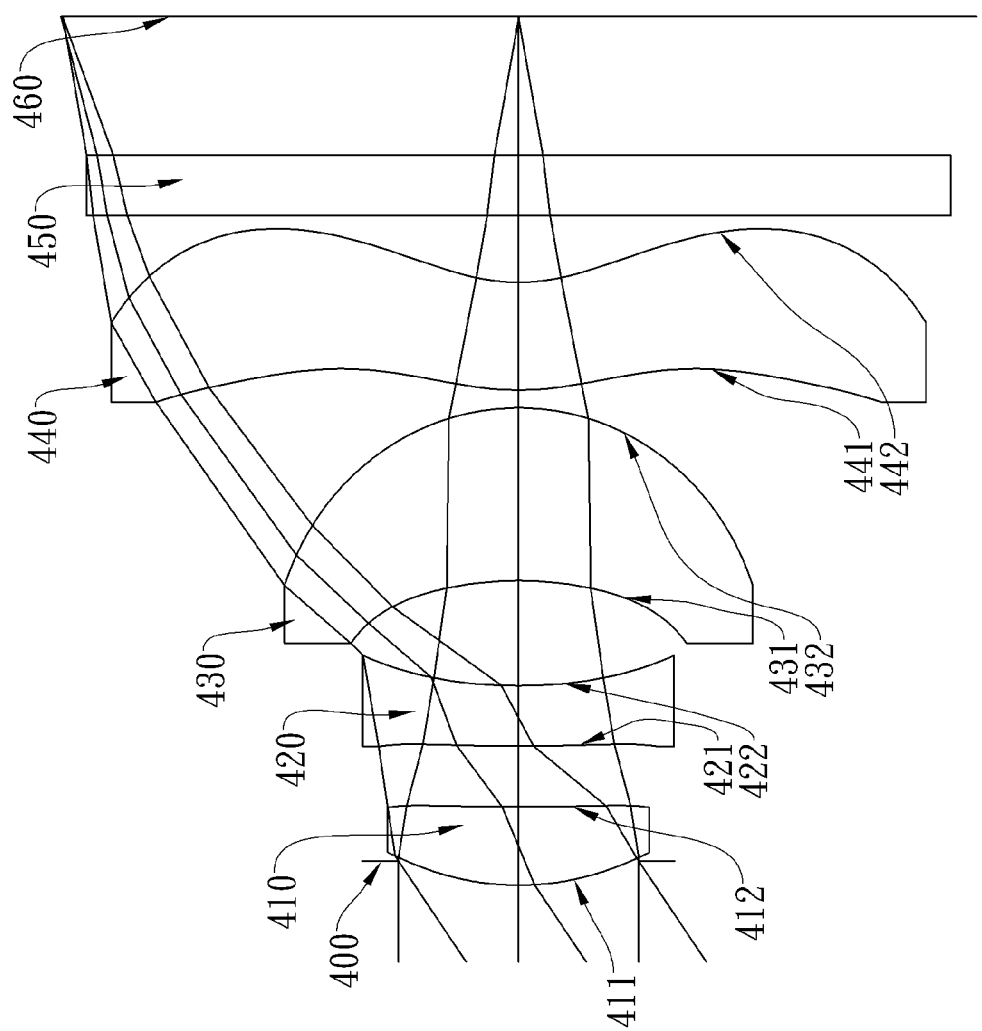
FIG. 4A shows an optical imaging lens system in accordance with a fourth embodiment of the present invention.
Figure 4B:
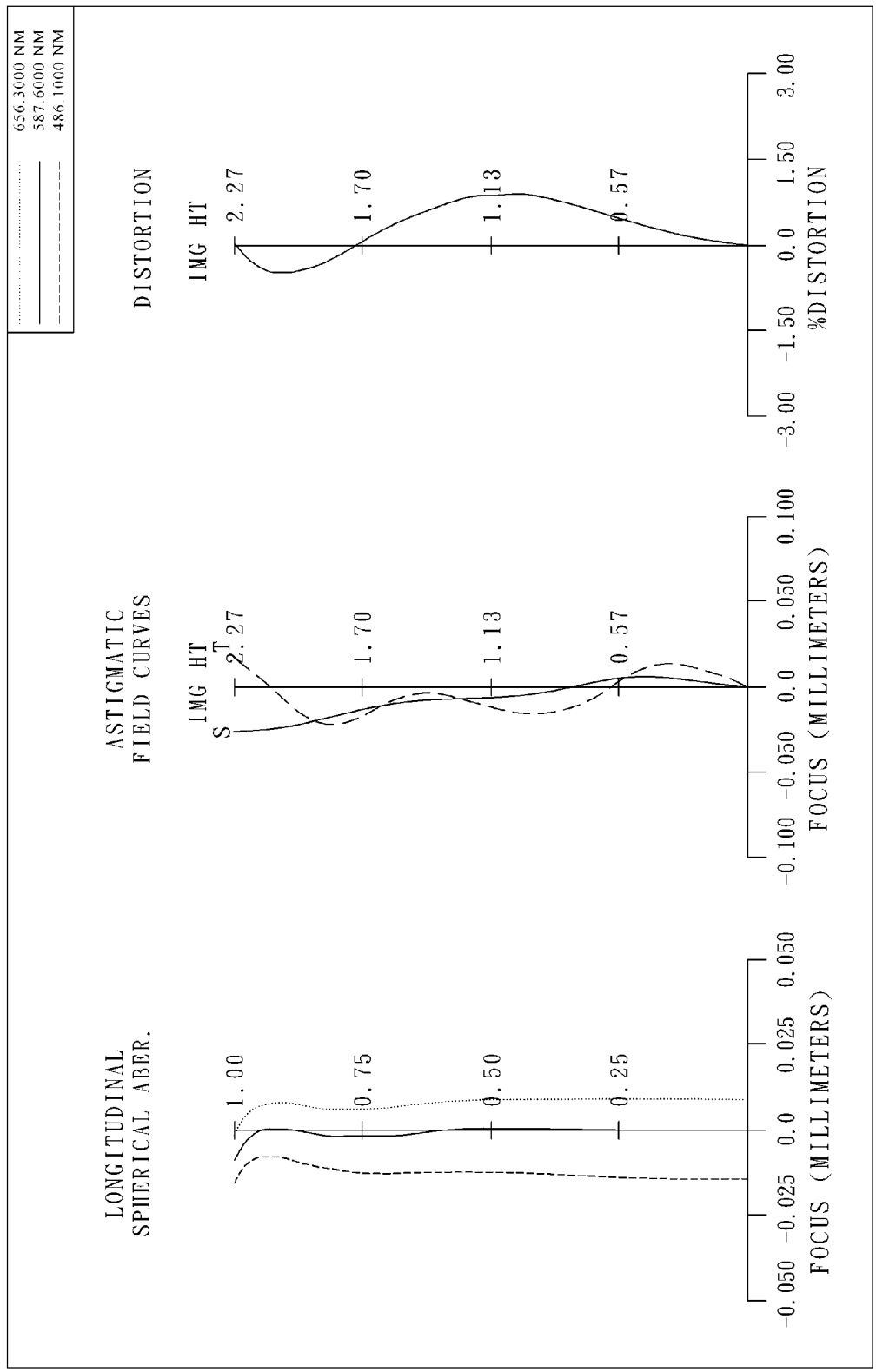
FIG. 4B shows the aberration curves of the fourth embodiment of the present invention.

FIG. 4A shows an optical imaging lens system in accordance with a fourth embodiment of the present invention, and FIG. 4B shows the aberration curves of the fourth embodiment of the present invention. The optical imaging lens system of the fourth embodiment of the present invention mainly comprises four lens elements, in order from an object side to an image side:

a plastic first lens element 410 with positive refractive power having a convex object-side surface 411 and a concave image-side surface 412, the object-side and image-side surfaces 411 and 412 thereof being aspheric;

a plastic second lens element 420 with negative refractive power having a convex object-side surface 421 and a concave image-side surface 422, the object-side and image-side surfaces 421 and 422 thereof being aspheric;

a plastic third lens element 430 with positive refractive power having a concave object-side surface 431 and a convex image-side surface 432, the object-side and image-side surfaces 431 and 432 thereof being aspheric; and a plastic fourth lens element 440 with negative refractive power having a convex object-side surface 441 and a concave image-side surface 442, the object-side and image-side surfaces 441 and 442 thereof being aspheric, and at least one inflection point is form on both the object-side and image-side surfaces 441 and 442 thereof;

wherein an aperture stop 400 is disposed between the object and the first lens element 410;

the optical imaging lens system further comprises an IR filter 450 disposed between the image-side surface 442 of the fourth lens element 440 and an image plane 460; an electronic sensor is further provided on the image plane 460; the IR filter 450 is made of glass and has no influence on the focal length of the optical imaging lens system.

The equation of the aspheric surface profiles of the fourth embodiment has the same form as that of the first embodiment.

In the fourth embodiment of the present optical imaging lens system, the focal length of the optical imaging lens system is f, and it satisfies the relation: f=3.40 (mm).

In the fourth embodiment of the present optical imaging lens system, the f-number of the optical imaging lens system is Fno, and it satisfies the relation: Fno=2.85.

In the fourth embodiment of the present optical imaging lens system, half of the maximal field of view of the optical imaging lens system is HFOV, and it satisfies the relation: HFOV=33.8 deg.

In the fourth embodiment of the present optical imaging lens system, the refractive index of the first lens element 410 is N1, and it satisfies the relation: N1=1.544.

In the fourth embodiment of the present optical imaging lens system, the Abbe number of the first lens element 410 is V1, the Abbe number of the second lens element 420 is V2, and they satisfy the relation: V1−V2=34.5.

In the fourth embodiment of the present optical imaging lens system, the on-axis spacing between the first lens element 410 and the second lens element 420 is T12, the on-axis spacing between the second lens element 420 and the third lens element 430 is T23, and they satisfy the relation: T12/T23=0.58.

In the fourth embodiment of the present optical imaging lens system, the radius of curvature of the object-side surface 411 of the first lens element 410 is R1, the radius of curvature of the image-side surface 412 of the first lens element 410 is R2, and they satisfy the relation: R1/R2=0.11.

In the fourth embodiment of the present optical imaging lens system, the radius of curvature of the image-side surface 422 of the second lens element 420 is R4, the radius of curvature of the object-side surface 421 of the second lens element 420 is R3, and they satisfy the relation: R4/R3=0.26.

In the fourth embodiment of the present optical imaging lens system, the focal length of the optical imaging lens system is f, the focal length of the first lens element 410 is f1, and they satisfy the relation: f/f1=1.26.

In the fourth embodiment of the present optical imaging lens system, the focal length of the optical imaging lens system is f, the focal length of the third lens element 430 is f3, and they satisfy the relation: f/f3=0.72.

In the fourth embodiment of the present optical imaging lens system, the focal length of the optical imaging lens system is f, the focal length of the fourth lens element 440 is f4, and they satisfy the relation: |f/f4|=0.43.

In the fourth embodiment of the present optical imaging lens system, the vertical distance between a maximum effective diameter position on the image-side surface 432 of the third lens element 430 and the optical axis is Y32, the distance in parallel with the optical axis from the maximum effective diameter position on the image-side surface 432 of the third lens element 430 to the on-axis vertex on the image-side surface 432 of the third lens element 430 is SAG32, and they satisfy the relation: SAG32/Y32=0.76.

In the fourth embodiment of the present optical imaging lens system, the distance on the optical axis between the aperture stop 400 and the electronic sensor is SL, the distance on the optical axis between the object-side surface 411 of the first lens element 400 and the electronic sensor is TTL, and they satisfy the relation: SL/TTL=0.97.

In the fourth embodiment of the present optical imaging lens system, the distance on the optical axis between the object-side surface 411 of the first lens element 410 and the electronic sensor is TTL, half of the diagonal length of the effective pixel area of the electronic sensor is ImgH, and they preferably satisfy the relation: TTL/ImgH=1.86.

The detailed optical data of the fourth embodiment is shown in FIG. 12 (TABLE 7), and the aspheric surface data is shown in FIG. 13 (TABLE 8), wherein the units of the radius of curvature, the thickness and the focal length are expressed in mm, and HFOV is half of the maximal field of view.

Embodiment 5

Figure 5A:
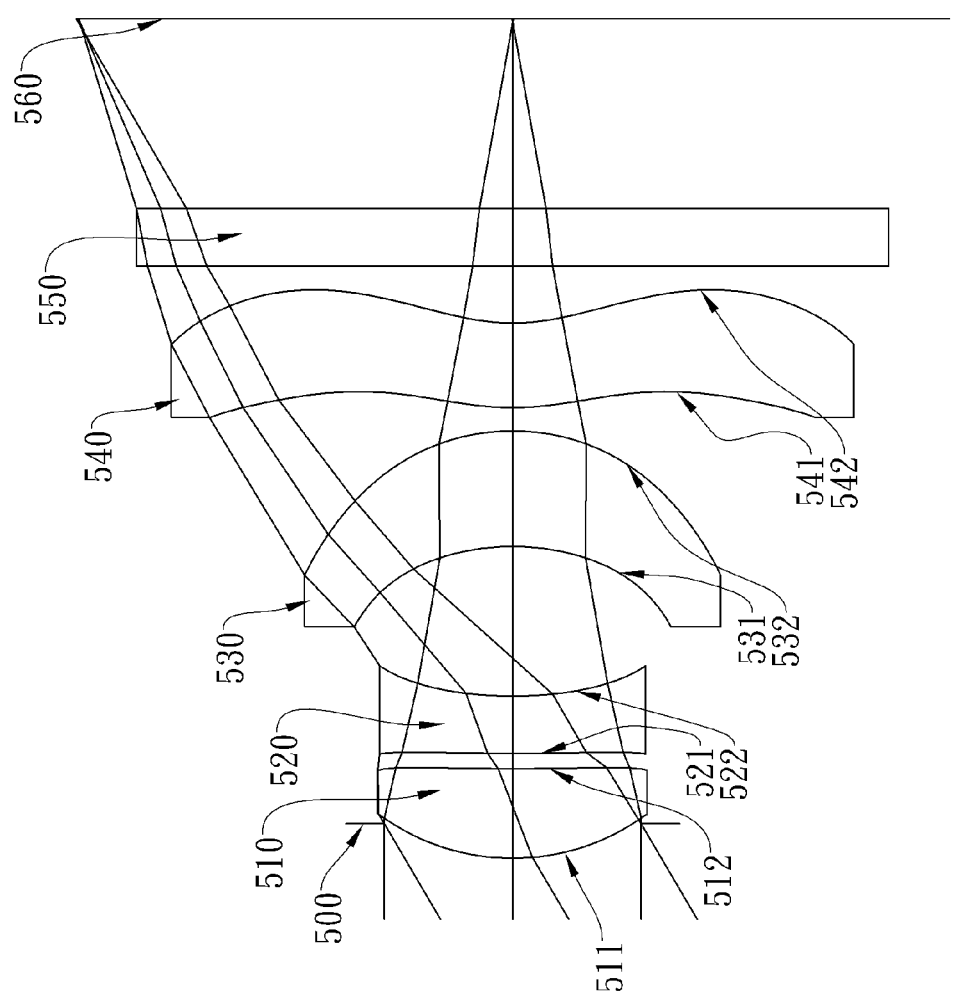
FIG. 5A shows an optical imaging lens system in accordance with a fifth embodiment of the present invention.
Figure 5B:
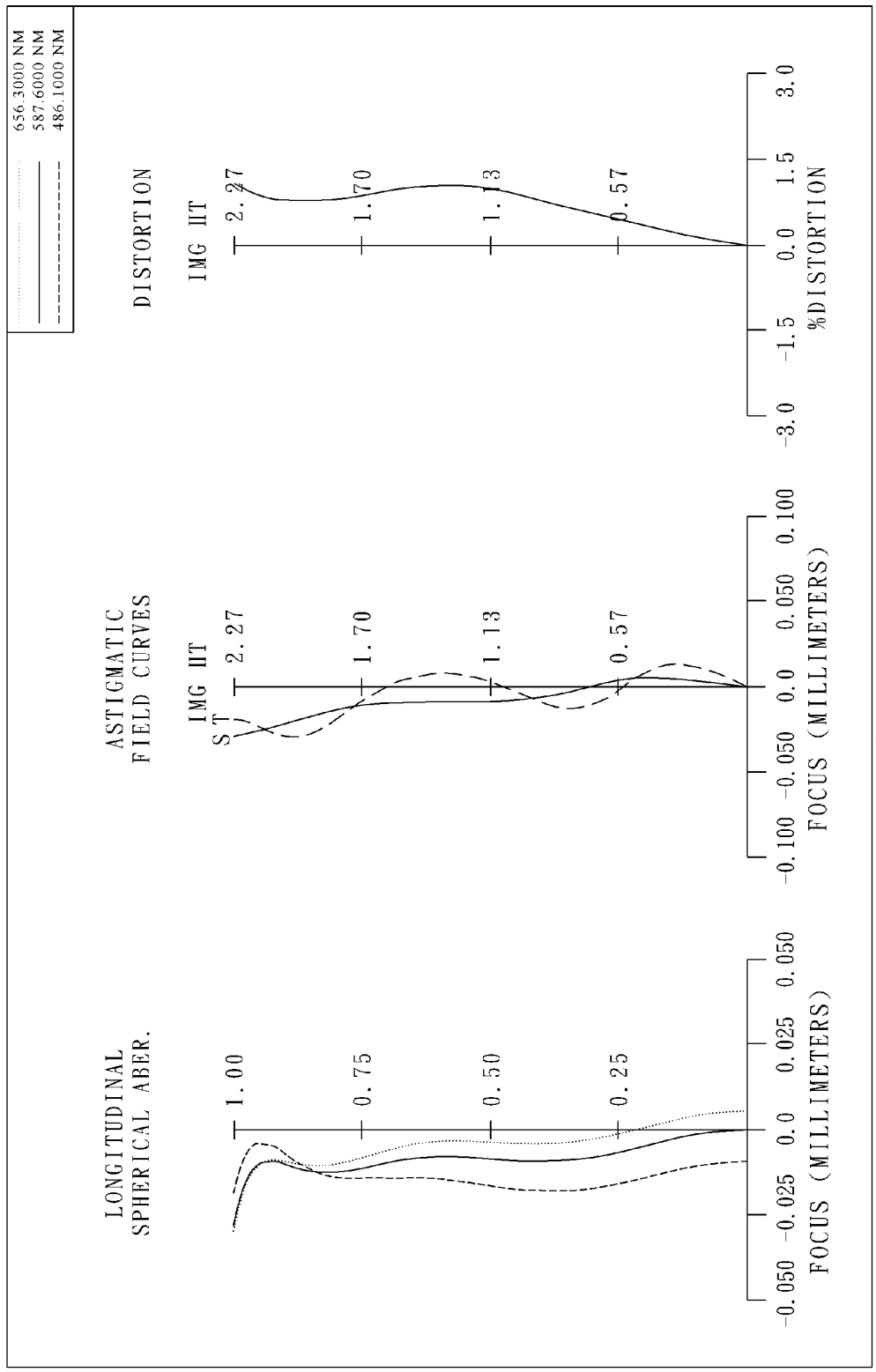
FIG. 5B shows the aberration curves of the fifth embodiment of the present invention.

FIG. 5A shows an optical imaging lens system in accordance with a fifth embodiment of the present invention, and FIG. 5B shows the aberration curves of the fifth embodiment of the present invention. The optical imaging lens system of the fifth embodiment of the present invention mainly comprises four lens elements, in order from an object side to an image side:

a plastic first lens element 510 with positive refractive power having a convex object-side surface 511 and a concave image-side surface 512, the object-side and image-side surfaces 511 and 512 thereof being aspheric;

a plastic second lens element 520 with negative refractive power having a convex object-side surface 521 and a concave image-side surface 522, the object-side and image-side surfaces 521 and 522 thereof being aspheric;

a plastic third lens element 530 with positive refractive power having a concave object-side surface 531 and a convex image-side surface 532, the object-side and image-side surfaces 531 and 532 thereof being aspheric; and a plastic fourth lens element 540 with negative refractive power having a convex object-side surface 541 and a concave image-side surface 542, the object-side and image-side surfaces 541 and 542 thereof being aspheric, and at least one inflection point is form on both the object-side and image-side surfaces 541 and 542 thereof;

wherein an aperture stop 500 is disposed between the object and the first lens element 510;

the optical imaging lens system further comprises an IR filter 550 disposed between the image-side surface 542 of the fourth lens element 540 and an image plane 560; an electronic sensor is further provided on the image plane 560; the IR filter 550 is made of glass and has no influence on the focal length of the optical imaging lens system.

The equation of the aspheric surface profiles of the fifth embodiment has the same form as that of the first embodiment.

In the fifth embodiment of the present optical imaging lens system, the focal length of the optical imaging lens system is f, and it satisfies the relation: f=3.82 (mm).

In the fifth embodiment of the present optical imaging lens system, the f-number of the optical imaging lens system is Fno, and it satisfies the relation: Fno=2.85.

In the fifth embodiment of the present optical imaging lens system, half of the maximal field of view of the optical imaging lens system is HFOV, and it satisfies the relation: HFOV=30.4 deg.

In the fifth embodiment of the present optical imaging lens system, the refractive index of the first lens element 510 is N1, and it satisfies the relation: N1=1.544.

In the fifth embodiment of the present optical imaging lens system, the Abbe number of the first lens element 510 is V1, the Abbe number of the second lens element 520 is V2, and they satisfy the relation: V1−V2=32.5.

In the fifth embodiment of the present optical imaging lens system, the on-axis spacing between the first lens element 510 and the second lens element 520 is T12, the on-axis spacing between the second lens element 520 and the third lens element 530 is T23, and they satisfy the relation: T12/T23=0.10.

In the fifth embodiment of the present optical imaging lens system, the radius of curvature of the object-side surface 511 of the first lens element 510 is R1, the radius of curvature of the image-side surface 512 of the first lens element 510 is R2, and they satisfy the relation: R1/R2=0.06.

In the fifth embodiment of the present optical imaging lens system, the radius of curvature of the image-side surface 522 of the second lens element 520 is R4, the radius of curvature of the object-side surface 521 of the second lens element 520 is R3, and they satisfy the relation: R4/R3=0.11.

In the fifth embodiment of the present optical imaging lens system, the focal length of the optical imaging lens system is f, the focal length of the first lens element 510 is f1, and they satisfy the relation: f/f1=1.65.

In the fifth embodiment of the present optical imaging lens system, the focal length of the optical imaging lens system is f, the focal length of the third lens element 530 is f3, and they satisfy the relation: f/f3=0.42.

In the fifth embodiment of the present optical imaging lens system, the focal length of the optical imaging lens system is f, the focal length of the fourth lens element 540 is f4, and they satisfy the relation: |f/f4|=0.25.

In the fifth embodiment of the present optical imaging lens system, the vertical distance between a maximum effective diameter position on the image-side surface 532 of the third lens element 530 and the optical axis is Y32, the distance in parallel with the optical axis from the maximum effective diameter position on the image-side surface 532 of the third lens element 530 to the on-axis vertex on the image-side surface 532 of the third lens element 530 is SAG32, and they satisfy the relation: SAG32/Y32=0.69.

In the fifth embodiment of the present optical imaging lens system, the distance on the optical axis between the aperture stop 500 and the electronic sensor is SL, the distance on the optical axis between the object-side surface 511 of the first lens element 500 and the electronic sensor is TTL, and they satisfy the relation: SL/TTL=0.96.

In the fifth embodiment of the present optical imaging lens system, the distance on the optical axis between the object-side surface 511 of the first lens element 510 and the electronic sensor is TTL, half of the diagonal length of the effective pixel area of the electronic sensor is ImgH, and they preferably satisfy the relation: TTL/ImgH=1.89.

The detailed optical data of the fifth embodiment is shown in FIG. 14 (TABLE 9), and the aspheric surface data is shown in FIG. 15 (TABLE 10), wherein the units of the radius of curvature, the thickness and the focal length are expressed in mm, and HFOV is half of the maximal field of view.

It is to be noted that TABLES 1-10 (illustrated in FIGS. 6-15 respectively) show different data of the different embodiments, however, the data of the different embodiments are obtained from experiments. Therefore, any optical imaging lens system of the same structure is considered to be within the scope of the present invention even if it uses different data. The embodiments depicted above and the appended drawings are exemplary and are not intended to limit the scope of the present invention. TABLE 11 (illustrated in FIG. 16) shows the data of the respective embodiments resulting from the equations.

What is claimed is:

1. An optical imaging lens system, in order from an object side to an image side comprising:
    a first lens element with positive refractive power having a convex object-side surface and a concave image-side surface, wherein the portion of the object-side surface of the first lens element in proximity to the optical axis is convex and the portion of the image-side surface of the first lens element in proximity to the optical axis is concave;
    a second lens element with negative refractive power having a convex object-side surface and a concave image-side surface;
    a third lens element with positive refractive power; and
    a fourth lens element having a concave image-side surface, and at least one of the object-side and image-side surfaces thereof being aspheric;
    wherein the optical imaging lens system further comprises an aperture stop and an electronic sensor on which an object is imaged, and the aperture stop is positioned between an object and the first lens element;
    wherein there are four lens elements with refractive power;
    wherein a focal length of the optical imaging lens system is f, a focal length of the third lens element is f3, a focal length of the fourth lens element is f4, an on-axis spacing between the first lens element and the second lens element is T12, an on-axis spacing between the second lens element and the third lens element is T23, a distance on the optical axis between the aperture stop and the electronic sensor is SL, a distance on the optical axis between the object-side surface of the first lens element and the electronic sensor is TTL, and they satisfy the relation:

$0<f/f3<0.9;$ $|f/f4|<0.75;$ $0<T12/T23<0.27;$ and $0.9<SL/TTL<1.2.$

2. The optical imaging lens system according to claim 1, wherein at least one inflection point is formed on at least one surface of the object-side and image-side surfaces of the fourth lens element, and the fourth lens element is made of plastic.

3. The optical imaging lens system according to claim 2, wherein the third lens element has a concave object-side surface and a convex image-side surface, and a refractive index of the first lens element is N1, and it satisfies the relation:

$1.4 < N1 < 1.6.$

4. The optical imaging lens system according to claim 3, wherein a radius of curvature of the image-side surface of the second lens element is R4, a radius of curvature of the object-side surface of the second lens element is R3, and they satisfy the relation:

$0 < R4/R3 < 0.3.$

5. The optical imaging lens system according to claim 3, wherein a focal length of the optical imaging lens system is f, a focal length of the third lens element is f3, and they satisfy the relation:

$0 < f/f3 < 0.75.$

6. The optical imaging lens system according to claim 5, wherein the fourth lens element has negative refractive power and a convex object-side surface.

7. The optical imaging lens system according to claim 6, wherein a focal length of the optical imaging lens system is f, a focal length of the fourth lens element is f4, and they satisfy the relation:

$|f/f4| < 0.5.$

8. The optical imaging lens system according to claim 6, wherein a vertical distance between a maximum effective diameter position on the image-side surface of the third lens element and the optical axis is Y32, a distance in parallel with the optical axis from the maximum effective diameter position on the image-side surface of the third lens element to the on-axis vertex on the image-side surface of the third lens element is SAG32, and they satisfy the relation:

$0.5 < SAG32/Y32 < 0.8.$

9. The optical imaging lens system according to claim 6, wherein a focal length of the optical imaging lens system is f, a focal length of the first lens element is f1, and they satisfy the relation:

$1.2 < f/f1 < 1.7.$

10. The optical imaging lens system according to claim 6, wherein a focal length of the optical imaging lens system is f, a focal length of the third lens element is f3, and they satisfy the relation:

$0 < f/f3 < 0.5.$

11. The optical imaging lens system according to claim 6, wherein an Abbe number of the first lens element is V1, an Abbe number of the second lens element is V2, and they satisfy the relation:

$30 < V1 - V2 < 42.$

12. The optical imaging lens system according to claim 11, wherein a radius of curvature of the object-side surface of the first lens element is R1, a radius of curvature of the image-side surface of the first lens element is R2, and they satisfy the relation:

$0 < R1/R2 < 0.2.$

13. The optical imaging lens system according to claim 1, wherein a distance on the optical axis between the object-side surface of the first lens element and the electronic sensor is TTL, half of the diagonal length of the effective pixel area of the electronic sensor is ImgH, and they satisfy the relation:

$TTL/ImgH < 1.95.$

14. An optical imaging lens system, in order from an object side to an image side comprising:
- a first lens element with positive refractive power having a convex object-side surface and a concave image-side surface, wherein the portion of the object-side surface of the first lens element in proximity to the optical axis is convex and the portion of the image-side surface of the first lens element in proximity to the optical axis is concave;
- a second lens element with negative refractive power having a convex object-side surface and a concave image-side surface;
- a third lens element with positive refractive power having a concave object-side surface and a convex image-side surface, and at least one of the object-side and image-side surfaces thereof being aspheric; and
- a fourth lens element with negative refractive power having a convex object-side surface and a concave image-side surface, and at least one of the object-side and image-side surfaces thereof being aspheric;
- wherein the optical imaging lens system further comprises an aperture stop and an electronic sensor on which an object is imaged, and the aperture stop is positioned between an object and the first lens element;
- wherein there are four lens elements with refractive power;
- wherein a radius of curvature of the image-side surface of the second lens element is R4, a radius of curvature of the object-side surface of the second lens element is R3, a distance on the optical axis between the aperture stop and the electronic sensor is SL, a distance on the optical axis between the object-side surface of the first lens element and the electronic sensor is TTL, an on-axis spacing between the first lens element and the second lens element is T12, an on-axis spacing between the second lens element and the third lens element is T23, and they satisfy the relation:

$0 < R4/R3 < 0.3;$ $0.9 < SL/TTL < 1.2;$ and $0 < T12/T23 < 0.6.$

15. The optical imaging lens system according to claim 14, wherein at least one inflection point is formed on at least one surface of the object-side and image-side surfaces of the fourth lens element, and the fourth lens element is made of plastic.

16. The optical imaging lens system according to claim 15, wherein a focal length of the optical imaging lens system is f, a focal length of the third lens element is f3, and they satisfy the relation:

$0 < f/f3 < 0.9.$

17. The optical imaging lens system according to claim 16, wherein a focal length of the optical imaging lens system is f, a focal length of the fourth lens element is f4, and they satisfy the relation:

$|f/f4| < 0.5.$

18. The optical imaging lens system according to claim 16, wherein an on-axis spacing between the first lens element and the second lens element is T12, an on-axis spacing between the second lens element and the third lens element is T23, and they satisfy the relation:

$0 < T12/T23 < 0.27.$

19. The optical imaging lens system according to claim 16, wherein an Abbe number of the first lens element is V1, an Abbe number of the second lens element is V2, and they satisfy the relation:

$$30 < V1 - V2 < 42.$$

20. The optical imaging lens system according to claim 15, wherein a focal length of the optical imaging lens system is f, a focal length of the third lens element is f3, and they satisfy the relation:

$$0 < f/f3 < 0.75.$$

* * * * *